United States Patent
Leblanc

(10) Patent No.: US 11,535,288 B2
(45) Date of Patent: Dec. 27, 2022

(54) TELESCOPING MODULES FOR USE IN MODULAR UTILITY SYSTEMS

(71) Applicant: ARCHI ENTERPRISES INC., Vancouver (CA)

(72) Inventor: Alexander Leblanc, Vancouver (CA)

(73) Assignee: ARCHI ENTERPRISES INC.

( * ) Notice: Subject to any disclaimer, the term of this patent is extended or adjusted under 35 U.S.C. 154(b) by 2 days.

(21) Appl. No.: 16/824,319

(22) Filed: Mar. 19, 2020

(65) Prior Publication Data

US 2020/0216104 A1 Jul. 9, 2020

Related U.S. Application Data

(63) Continuation of application No. PCT/CA2018/051193, filed on Sep. 21, 2018.

(60) Provisional application No. 62/561,479, filed on Sep. 21, 2017.

(51) Int. Cl.

| F16M 11/26 | (2006.01) |
|---|---|
| B62B 3/02 | (2006.01) |
| E04G 25/04 | (2006.01) |
| F16B 7/14 | (2006.01) |
| F16B 7/10 | (2006.01) |

(52) U.S. Cl.
CPC ............... B62B 3/02 (2013.01); E04G 25/04 (2013.01); F16B 7/10 (2013.01); F16B 7/14 (2013.01); F16M 11/26 (2013.01)

(58) Field of Classification Search
None
See application file for complete search history.

(56) References Cited

U.S. PATENT DOCUMENTS

| 6,474,246 B2 | 11/2002 | Hsu |
| 6,595,144 B1 | 7/2003 | Doyle |
| 6,655,438 B2 | 12/2003 | Trochon et al. |
| 7,240,885 B1 * | 7/2007 | Sullivan ............... E04G 25/061 248/351 |
| 7,934,459 B2 | 5/2011 | Frazier |

(Continued)

FOREIGN PATENT DOCUMENTS

WO   WO 2004/036060 A1   4/2004

OTHER PUBLICATIONS

International Search Report and Written Opinion dated Jan. 4, 2019 issued in related PCT App. No. PCT/CA2018/051193 (9 pages).

*Primary Examiner* — Steven M Marsh
(74) *Attorney, Agent, or Firm* — Haynes and Boone, LLP

(57) ABSTRACT

Four types of telescoping modules are disclosed wherein the first type has a pair of opposed female ends, the second type has a pair of opposed female ends, and the third type has a female end and an opposed male end. The fourth type has two opposed male ends between which a positionable threaded rod and retaining components stably extend the length between the male ends of the telescoping module. Alternatively, the fourth type of telescoping module may have a female end and a male end. Each of the male ends of the second, third, and fourth types of telescoping modular components comprises a cylindrical body with one or more linear set(s) of two or more spaced-apart prongs on the circumferential surface of the cylindrical body. Each of the female ends has a cylindrical receptacle with one or more linear channels and/or prong-retaining slots for receiving therein the cylindrical body.

16 Claims, 15 Drawing Sheets

(56) References Cited

U.S. PATENT DOCUMENTS

| | | | |
|---|---|---|---|
| 8,967,170 B1* | 3/2015 | Lai | A45B 9/00 |
| | | | 135/75 |
| 9,003,979 B2 | 4/2015 | Bahnof | |
| 9,655,445 B2 | 5/2017 | Gammon et al. | |
| 9,723,920 B1 | 8/2017 | Wu | |
| 9,957,008 B1* | 5/2018 | Tsai | B62J 1/08 |
| 2006/0279143 A1* | 12/2006 | Platz | H02K 5/24 |
| | | | 310/51 |
| 2010/0282921 A1* | 11/2010 | Hein | F16M 11/32 |
| | | | 248/125.8 |
| 2014/0260070 A1* | 9/2014 | Barcroft | B66F 3/00 |
| | | | 52/741.1 |
| 2015/0159801 A1* | 6/2015 | Oda | F16M 11/046 |
| | | | 248/125.2 |
| 2018/0177288 A1* | 6/2018 | Lin | H02K 7/06 |

* cited by examiner

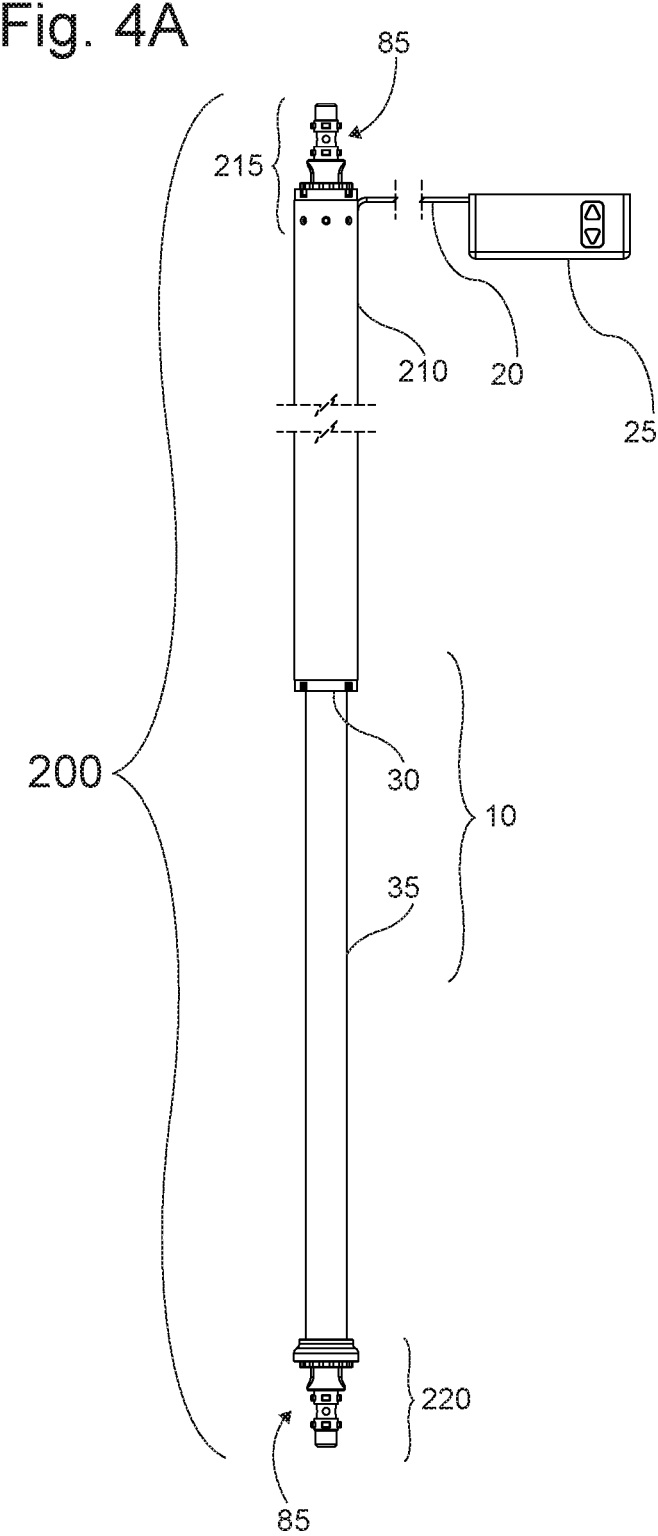
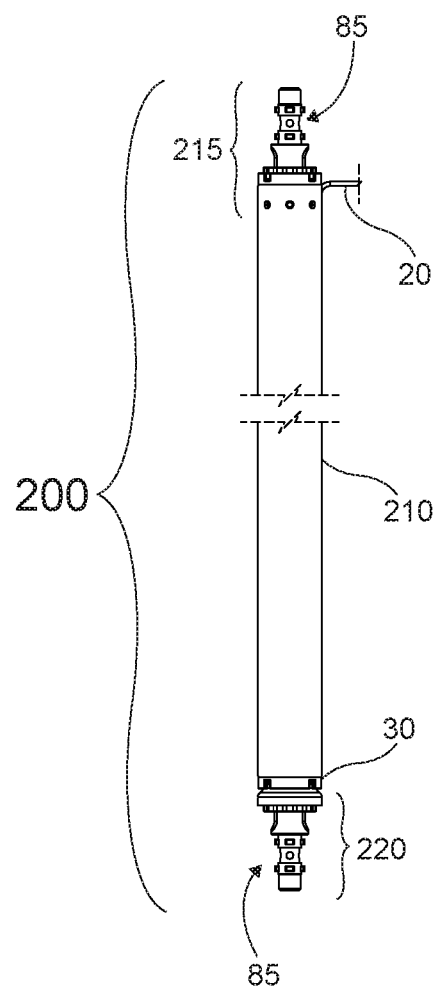
Fig. 4A
Fig. 4B

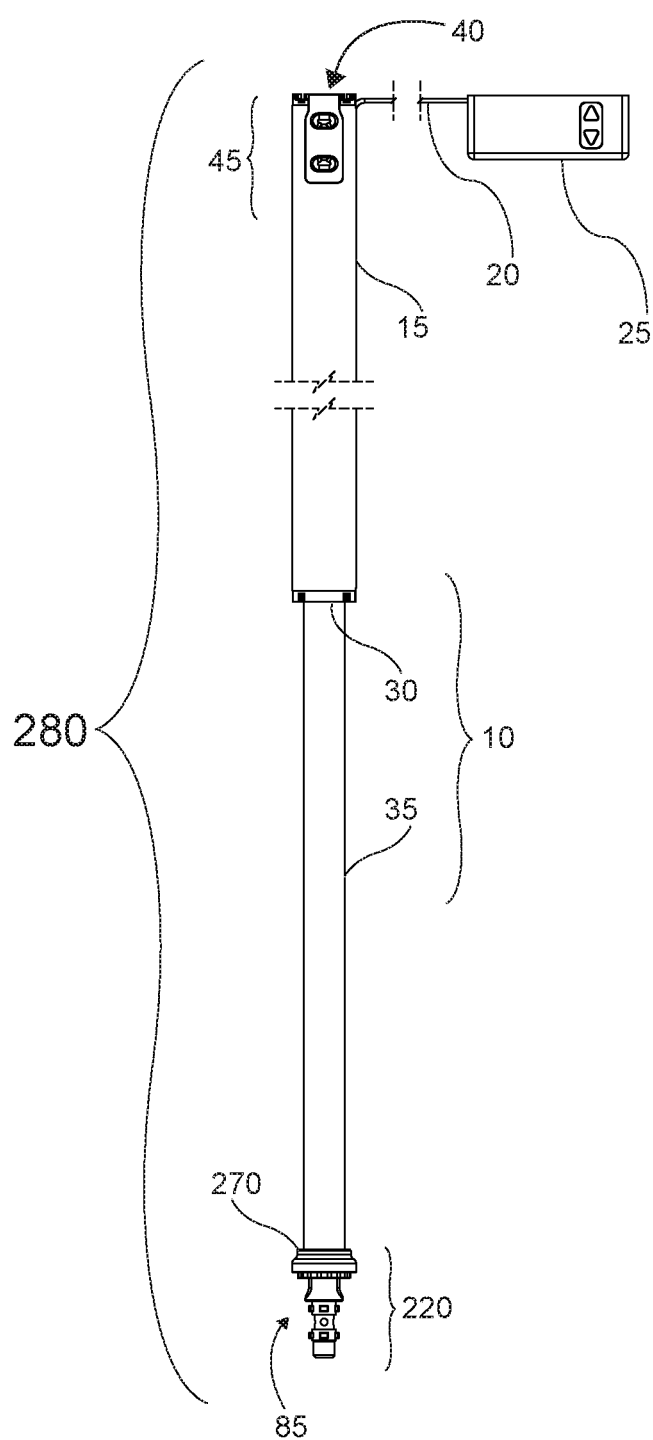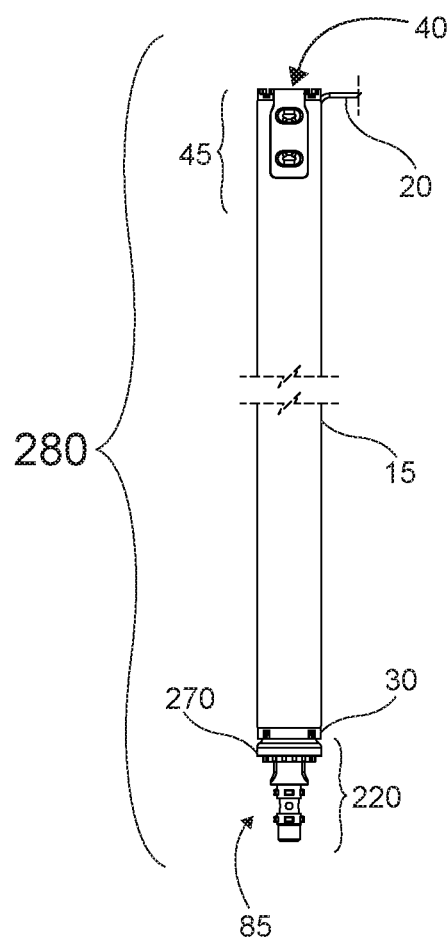

TELESCOPING MODULES FOR USE IN MODULAR UTILITY SYSTEMS

CROSS-REFERENCE TO RELATED APPLICATION

This application is related to International Application No. PCT/CA2018/051193 filed on Sep. 21, 2018 with the Canadian PCT Receiving Office; U.S. patent application Ser. No. 16/138,422 filed Sep. 21, 2018 and U.S. Provisional Application No. 62/561,479 filed Sep. 21, 2017 said applications incorporated hereinto by reference.

TECHNICAL FIELD

The present disclosure relates to the field of utility equipment, carts, and furniture, and in particular, to modular components for demountable engagement into various configurations of assemblies for uses such as work surfaces, shelving units, racks, utility carts, equipment support apparatuses, staging systems, and bedframe systems.

BACKGROUND

Utility equipment of various forms are essential to every industry and can range vastly in size and complexity in order to meet the particular needs of a selected industry. Irrespective of the industry, most utility equipment is designed to have a single function. Consequently, a variety of utility equipment is required to meet the various needs of a selected industry.

Many work environments can make use of portable height-adjustable equipment support apparatus, racks, stands, storage, shelving, and carts that can be easily, quickly, and safely raised and lowered to enable positioning or transfer of equipment, instruments, devices, hardware, components, materials, supplies, merchandise, clothing, sports gear, luggage, and other items onto and from an assembly after which, sections of the assembly can be raised out of the way to provide clearance to staff moving about in proximity to and/or under the assembly. Additionally, it may be desirable to raise and lower assembled work surfaces to provide ergonomic standing or sitting use of the work surface by individuals having different heights and performing different types of work tasks. Man-lift and staging systems can also be configured where work tasks or access may be required at varying heights in a variety of work settings. A number of height-adjustable equipment support apparatuses, racks, stands, carts, storage systems, shelf-lift systems, table-lift systems, and bed-lift systems can additionally be configured for various household needs.

SUMMARY

The present disclosure generally relates to telescoping modules configured for demountable engagement into modular assemblies comprising work surfaces and/or shelving systems and/or utility carts and/or storage systems and/or racks and/or equipment support apparatuses and/or stands and/or staging systems and/or bedframe systems. More specifically, this disclosure pertains to telescoping modules that may be incorporated into sturdy and durable utility system assemblies for temporary use on a work site or a home location wherein the assemblies can be configured and quickly assembled by interconnecting and securely engaging a plurality of modular structural support components to configure a desired utility assembly. After the need for the utility system assembly has been satisfied and the assembly is no longer required on a work site or other location, it can be quickly and easily disassembled into the individual modular elements that can be collected together for transport or storage.

One embodiment of the present disclosure relates to three types of telescoping modules wherein the first type has a pair of opposed female ends, the second type has a pair of opposed male ends, and the third type has a female end and an opposed male end. A fourth type of telescoping module disclosed herein comprises two opposed male ends between which a positionable threaded rod and retaining components stably extend the length between the male ends of the telescoping module.

Each of the male ends of the second, third, and fourth types of telescoping modular components comprises a cylindrical body with one or more linear set(s) of two or more spaced-apart prongs on the circumferential surface of the cylindrical body. Each of the female ends has a cylindrical receptacle with one or more linear channels and/or prong-retaining slots for receiving therein the cylindrical body and the at least one linear set of prongs. The female ends are provided with locking assemblies and/or fasteners for releasable engagement of the male ends. The telescoping modules disclosed herein are particularly suitable for demountable engagement with the various types of modules disclosed in International PCT Application No. PCT/CA2017/050376.

According to one aspect, a cylindrical body of a male end may have two or more linear sets of two or more spaced-apart prongs wherein the linear sets are equidistantly spaced apart around the circumferential surface of the cylindrical body. According to another aspect, a cylindrical receptacle of a female end may have two or more equidistantly spaced-apart linear channels and/or prong-retaining slots to receive and engage therein the cylindrical body having two or more linear sets of prongs.

According to one aspect, the telescoping modules disclosed herein may be used to configure and assemble storage racks and/or shelves and/or carts that may be lowered for access and then raised up to provide additional storage space underneath or alternatively, to provide clearance for other purposes.

According to another aspect, the telescoping modules disclosed herein can be used as legs or alternatively, incorporated into legs for a work surface such as, for example, a counter or a work bench or a desk or a business work station or a work platform or man-lift, and the like. Height-adjustable furniture assemblies may also be configured such as tables, seating, bedframes, and the like.

According to some embodiments, the telescoping modules disclosed herein may be incorporated into a variety of equipment-support apparatuses, stands, racks, and the like.

BRIEF DESCRIPTION OF THE DRAWINGS

These and other features of the disclosure will become more apparent in the following detailed description in which reference is made to the appended drawings, wherein:

FIGS. 1A and 1B are side views of an example of a telescoping module with opposing female ends wherein FIG. 1A is a side view showing the telescoping module with the female ends in an extended position, and FIG. 1B is a side view of the telescoping module with the female ends in a retracted position;

FIGS. 4A and 4B are side views of an example of a telescoping module with opposing male ends wherein FIG. 4A is a side view showing the telescoping module with the male ends in an extended position, and FIG. 4B is a side view of the telescoping module with the male ends in a retracted position;

FIGS. 7A and 7B are side views of an example of a telescoping module with a female end and a male end wherein FIG. 7A is a side view showing the telescoping module in an extended position, and FIG. 7B is a side view of the telescoping module in a retracted position;

FIGS. 8A-8C illustrate an example of a threaded-rod telescoping module wherein FIG. 8A is a whole perspective view, FIG. 8B is an exploded perspective view, and FIG. 8C is a cross-sectional view showing the threaded rod and retaining components contained therein;

DETAILED DESCRIPTION

Definitions

Figure 1A:
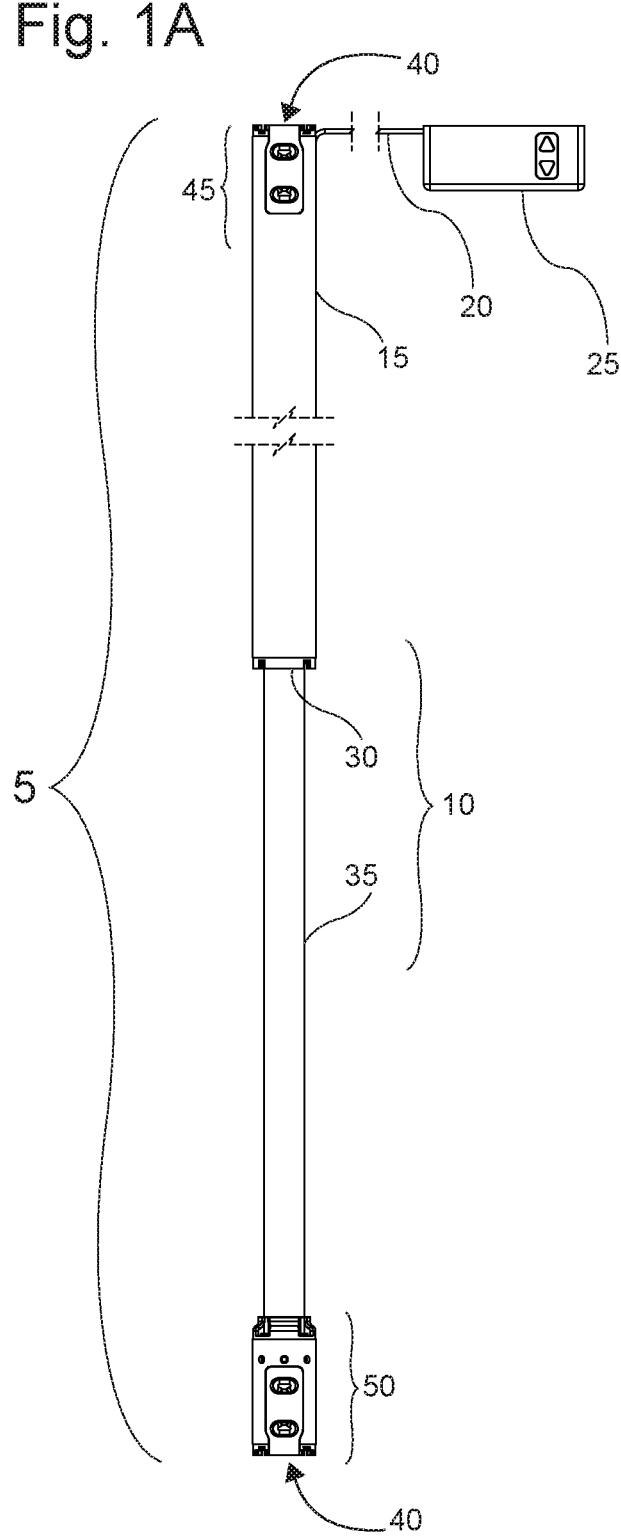

Unless defined otherwise, all technical and scientific terms used herein have the same meaning as commonly understood by one of ordinary skill in the art to which this disclosure relates.

As used herein, the term "about" refers to an approximately +1-10% variation from a given value. It is to be understood that such a variation is always included in any given value provided herein, whether or not it is specifically referred to.

As used herein, the term "perspective view" refers to a three-dimensional view of a component or a module or an assembly disclosed herein that portrays height, width, and depth of the component or module or assembly for a more realistic image and representation.

As used herein, the term "top view" refers to an illustration of a component or a module or an assembly that looks directly down on the top surface of the component or module or assembly.

As used herein, the term "side view" refers to an illustration of a component or a module or an assembly that looks horizontally and directly at a side of the component or module or assembly.

As used herein, the term "bottom view" refers to an illustration of a component or a module or an assembly that looks directly up on the bottom surface of the component or module or assembly.

As used herein, the terms "tray module" or "tray assembly" or "tray bottom" refer to a component that is incorporated into a utility cart system for transporting equipment, properties, materials, supplies, and the like around a worksite or other location. Alternatively, a tray module or tray assembly or tray bottom may be incorporated into a modular assembly for as a shelf, or a table, or a staging platform.

As used herein, the terms "table module" or "table assembly" or "desk module" or "desk assembly" or "shelf module" or "shelf assembly" refer to a component or modular assembly that provides a table or work station or shelving configuration, or alternatively may be used as a staging platform.

As used herein, the term "wheel module" means a modular assembly having a fixed or alternatively a pivotable wheel, for demountable engagement into a modular assembly to provide a rolling functionality. The wheels may be pneumatic, solid rubber, plastic, or foam.

As used herein, the term "telescoping module" means a component, a module, or an assembly providing a two-way structural extension having a length-adjustment mechanism to enable extension and retraction of the linear length of the module.

As used herein, the term "threaded-rod telescoping module" means a component providing a two-way structural extension having a length-adjustment mechanism to enable extension and retraction of the linear length of the module.

As used herein, the term "end-cap modules" means a category of modules having a demountable engagement mechanism to provide a terminus and a grip function or a handle function or a foot function or a pad function or a bumper function or a cap function, for incorporation into a structural support assembly.

The embodiments of the present disclosure generally relate to four types of telescoping modules that may be used for demountable engagement with the modules disclosed in International Application No. PCT/CA2017/050376 to configure a wide variety of structural assemblies.

A first embodiment of a telescoping module of the present disclosure comprises a telescoping assembly having a pair of opposed female ends. A second embodiment of a telescoping module of the present disclosure comprises a telescoping assembly having a pair of opposed male ends. A third embodiment of a telescoping module of the present disclosure comprises a telescoping assembly having a pair of opposed ends wherein one end is a female end and the opposite end is a male end. A fourth embodiment of a telescoping module of the present disclosure comprises a housing having opposed ends with a male end engaged and extending outward from one end, and the opposite end of the housing having an end plate with a threaded bore therethrough for threadably engaging a threaded rod provided therefor. A proximal end of the threaded rod is housed within the housing while the distal end is threadably extendible outward from and threadably retractable into the housing. A male end is engaged with the distal end of the threaded rod.

The female ends of the first and third types of telescoping modules are configured for demountable engagement with the male ends of the second, third, and fourth types of telescoping modules in addition to the various modules and components disclosed in International Application No. PCT/CA2017/050376, and the like. The male ends of the second, third, and fourth types of telescoping modules are additionally configured for demountable engagement with the female ends of the various modules and components disclosed in International Application No. PCT/CA2017/050376, and the like.

According to one aspect, each of the male ends may comprise a cylindrical body with at least one linear set of prongs, or two or more spaced-apart linear sets of prongs on the circumferential surface of the cylindrical body wherein each set of prongs has two or more spaced-apart prongs. According to some aspects, some of the male ends may have two linear sets of prongs spaced apart around the circumference of the cylindrical body, or alternatively, between three and twelve sets of prongs spaced apart around the circumference of the cylindrical body. According to some aspects, each set of prongs may have between one and eight spaced-apart prongs. According to some aspects, some of the male ends may have no prongs.

According to another aspect, each of the female ends may have a cylindrical receptacle for receiving and engaging therein a male cylindrical body. The female receptacle may have at least one linear channel or prong-retaining slot for slidingly receiving and engaging therein the prongs of the male ends. According to some aspects, some of the female ends may have receptacles with two linear channels or prong-retaining slots spaced apart along the length of the receptacle for receiving and engaging therein a male cylindrical body having two linear sets of prongs spaced apart around the circumference of the cylindrical body. Alternatively, some of the female ends may have receptacles with between three and twelve spaced-apart linear channels or prong-retaining slots for slidingly receiving and engaging therein a male cylindrical body having between three and twelve linear sets of prongs spaced apart around the circumference of the cylindrical body. According to another aspect, a female end may have no linear channels or prong-retaining slots for demountably engaging a male cylindrical body of a male end having no prongs. According to another aspect, some of the female ends may be provided with a locking assembly and/or one or more fasteners for demountable engagement therewith one of the male ends.

A key feature of the embodiments of the present disclosure pertains to mechanisms for enabling and facilitating quick, stable and secure demountable engagement of a telescoping module with another module of the present disclosure and/or disclosed in International Application No. PCT/CA2017/050376 so that the modules are securely and stably locked together.

Figure 1B:
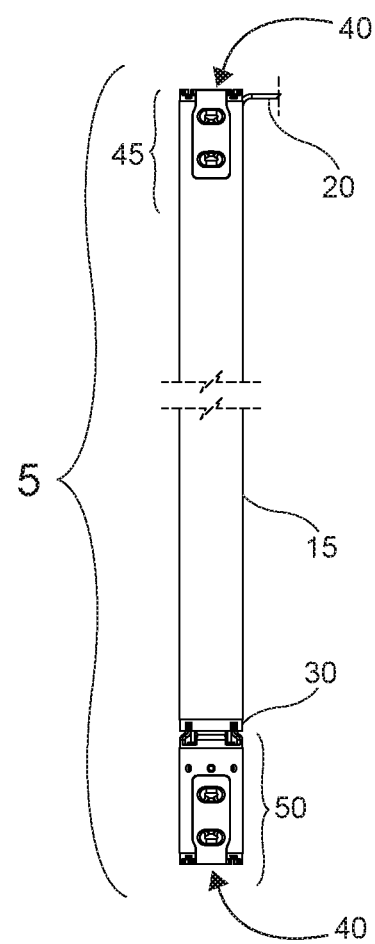

An example of a first type of telescoping module with female ends 5 is illustrated in FIGS. 1A and 1B wherein the telescoping module 5 generally comprises a telescoping assembly 10 contained within a first example of an extension-tube housing 15. A variety of types and sizes of telescoping systems including hydraulic, pneumatic, and/or motorized linear actuator systems may be employed in a telescoping module 5, and may be operated by remote control or directly at a control box 25 through a controls conduit 20 to activate or deactivate the telescoping system.

Figure 3:
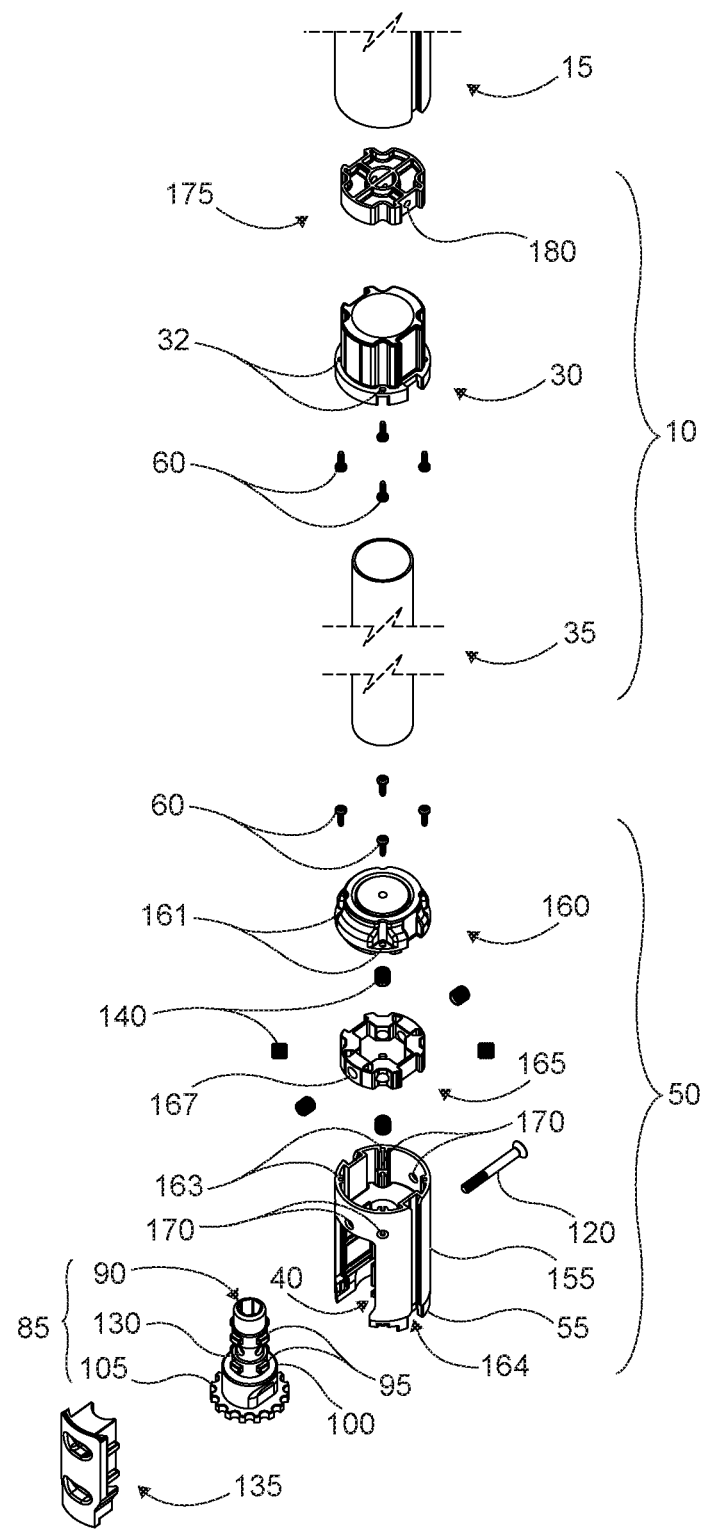
FIG. 3 is an exploded perspective view of an extender female end and cooperating telescoping assembly of the telescoping module shown in FIG. 1 and a corresponding male member flat-mount assembly for engagement with another module of the system (not shown)

According to certain embodiments, as illustrated in FIG. 3, a telescoping assembly 10 may comprise an extension-tube end guide 30 secured at one end of the first extension-tube housing 15 by screws 60 passed through unthreaded bores 32 in the guide 30 to be threadably engaged within thread-forming slots 70 on the inner contours of the extension-tube housing 15. The extension-tube end guide 30 may be slidingly cooperable with an extender 35 to extend or retract the overall length of the telescoping module with female ends 5.

A receptacle 40 is provided at the distal end of the extension-tube housing 15, comprising the housing female end 45. FIG. 1A shows the telescoping module 5 in an extended position with the extender 35 at a maximum length of extension out of the extension-tube housing 15 passed through the extension-tube end guide 30, while FIG. 1B shows the telescoping module 5 with the extender 35 fully retracted into the extension-tube housing 15. A second receptacle 40 is provided at the distal end of the extender 35, comprising the extender female end 50.

Figure 2:
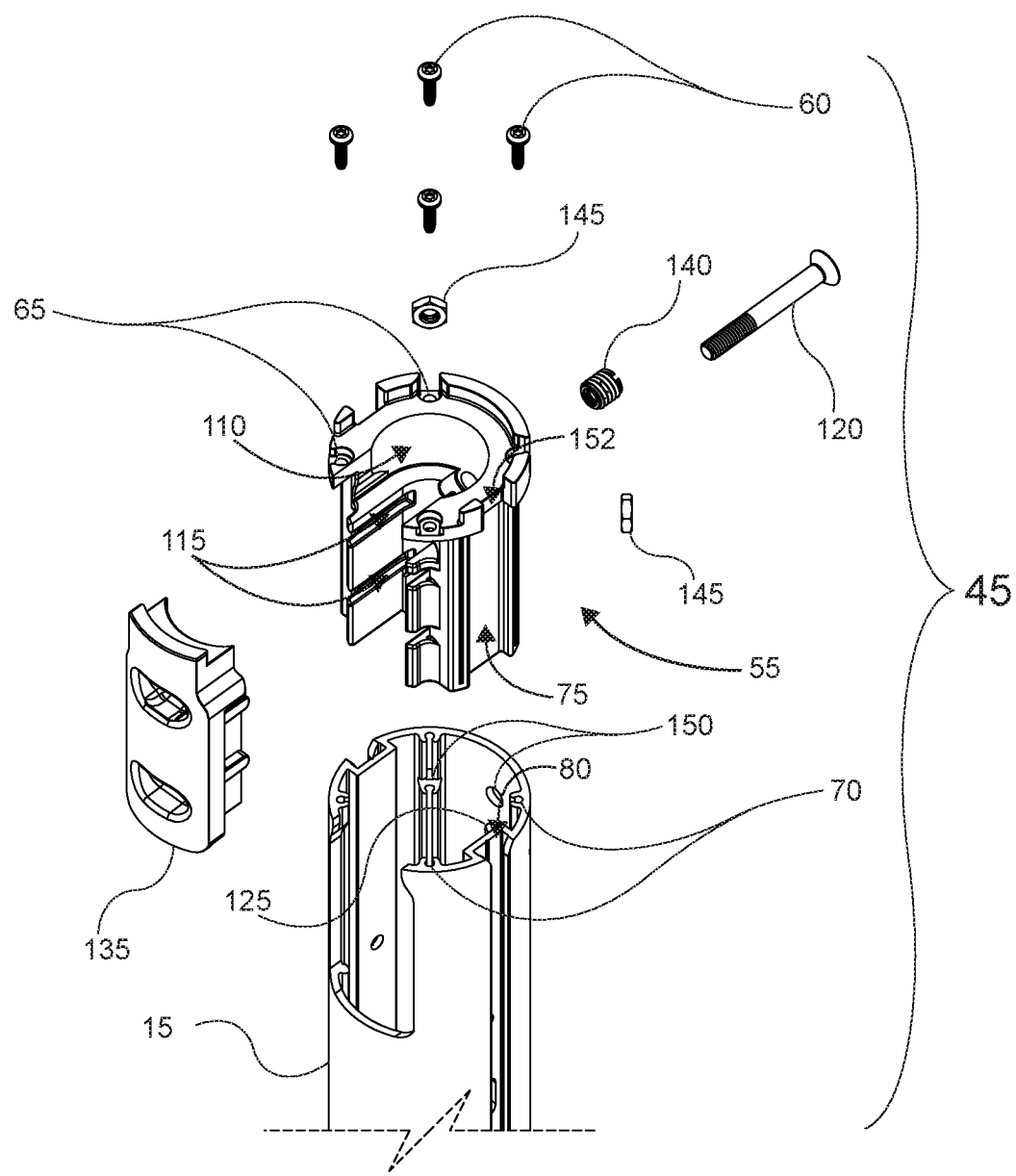
FIG. 2 is an exploded perspective view of a housing female end of the telescoping module shown in FIG. 1.

In reference to the various components disclosed in International Application No. PCT/CA2017/050376, a telescoping module's female end may be configured as a "rotator receptacle" or a "joiner receptacle" or a "side-opening receptacle" contained within a module's extension-tube housing. As illustrated in FIGS. 1 to 3, telescoping module with female ends 5 includes at each end, a side-opening receptacle 40. Within the housing female end 45, shown in FIG. 2, the side-opening receptacle generally comprises a side-opening receptacle socket 55 that can be slid on its side channels 75 into the distal end of extension-tube housing 15 against the inward-facing edges of the nut/conduit channels 80, where it is secured by screws 60 passed through unthreaded bores 65 in the socket 55 to be threadably engaged within thread-forming slots 70 on the inner contours of the extension-tube housing 15.

As disclosed in International Application No. PCT/CA2017/050376, certain modules of the system may include male ends for secure demountable engagement of the modules with other modules of the system having cooperating receptacles. One example of such a male end is the male member flat-mount assembly 85 shown in FIG. 3 in alignment for engagement with a corresponding module (not shown) for secure engagement within the side-opening receptacle socket 55. The male member flat-mount assembly 85 comprises a male component 90 with prongs 95, mounted on a wide pivot component 100 and a flat-mount pivot-lock sprocket 105 (as disclosed in International Application No. PCT/CA2017/050376 and described in further detail below in reference to FIGS. 5 and 6). The side-opening receptacle socket 55 includes cooperatively-shaped male member channels 110 and prong-retaining slots 115 (shown in FIG. 2) which securely engage the outer contours of an inserted male end such as the male member flat-mount assembly 85. Once inserted, the male assembly 85 may be fixed within the side-opening receptacle by a bolt 120 passed through a tube bore 125 in the extension-tube housing 15 and through an unthreaded bore 130 in the male component 90 to be threadably engaged within a threaded bore located centrally in the proximal side of a side-opening receptacle cover 135, which locks together the cooperating modules until the bolt 120 is removed.

According to some embodiments, the outer contours of the side-opening receptacle socket 55 may provide bores or slots for one or more threaded inserts 140 or hex nuts 145 to be secured when assembled within the extension-tube housing 15 where provided therefor are one or more side-mount bores 150 through which a bolt or a screw may secure other components or additional male ends such as a male member side-mount assembly 560, described below in reference to FIG. 15, or as disclosed in International Application No. PCT/CA2017/050376. Additional male member side-mount assemblies 560 may also be secured individually by a bolt threadably engaged with a T-nut passed through the channel openings 152 into the nut/conduit channels 80, 164 where not occupied by a telescoping module's controls conduit 20.

As illustrated in FIG. 3, a telescoping module may comprise an extender female end 50 with a receptacle 40 at the distal end of a telescoping assembly 10.

Extender female end 50 comprises a second example of an extension-tube housing 155 which is fastened to an extender female end adapter 160 by screws 60 passed through unthreaded bores 161 to be threadably engaged within thread-forming slots 163. Once assembled, channel openings in the adapter 160 or the receptacle socket 55 allow for passage of T-nuts into the nut/conduit channels 164, provided for secure threadable engagement with additional male ends or other components along the length of the extension-tube housing 155. For this same purpose, as described previously in International Application No. PCT/CA2017/050376 in reference to "middle square-nut holders", an extension-tube housing may also have secured within its inner contours a tube-middle threaded insert mount 165 comprising a plurality of threaded insert holes 167 wherein threaded inserts 140 may be provided for attachment of additional male member side-mount assemblies or other components (not shown) by a bolt or screw passed through side-mount bores 170 to be threadably engaged with a corresponding threaded insert 140. A tube-middle threaded insert mount 165 may be securely fixed in place within an extension tube housing by a set screw or alternatively, by use of a polymeric adhesive or brazing or crush ribs, and the like.

As previously noted, a telescoping module may be mechanized by a variety of types and sizes of telescoping systems including hydraulic, pneumatic, or motorized linear actuator systems. According to some embodiments, a telescoping assembly 10 may include a telescoping assembly mount 175 whereon an extender 35 or other telescoping mechanism may be directly or indirectly engaged and secured within the module. The outer contours of the telescoping assembly mount 175, similar to the tube-middle threaded insert mount 165, may match the inner profile of extension-tube housings for secure attachment therein, as illustrated in FIG. 3 in alignment for engagement with extension-tube housing 15, where it may be fixed in place by a set screw (not shown) engaged with mounting bore 180, for example, or by use of a polymeric adhesive, brazing, crush ribs, and the like.

An example of a second type of telescoping module is illustrated in FIGS. 4A and 4B, wherein a telescoping module with male ends 200 generally comprises a telescoping assembly 10 securely contained within a third example of an extension-tube housing 210, wherein it may be controlled by a control box 25 through a controls conduit 20. At the distal end of the extension-tube housing 210, the telescoping module 200 comprises the housing male end 215 with an example of a male member flat-mount assembly 85 for connection with another module of the system having a receptacle as disclosed herein or in International Application No. PCT/CA2017/050376. At the distal end of an extender 35, the telescoping module 200 comprises the extender male end 220 with a second male member flat-mount assembly 85 for attachment with another module's receptacle. FIG. 4A shows the telescoping module with male ends 200 in an extended position with the extender 35 at a maximum length of extension out of the extension-tube housing 210 passed through the extension-tube end guide 30, while FIG. 4B shows the telescoping module 200 with the extender 35 fully retracted into the extension-tube housing 210.

Figure 5:
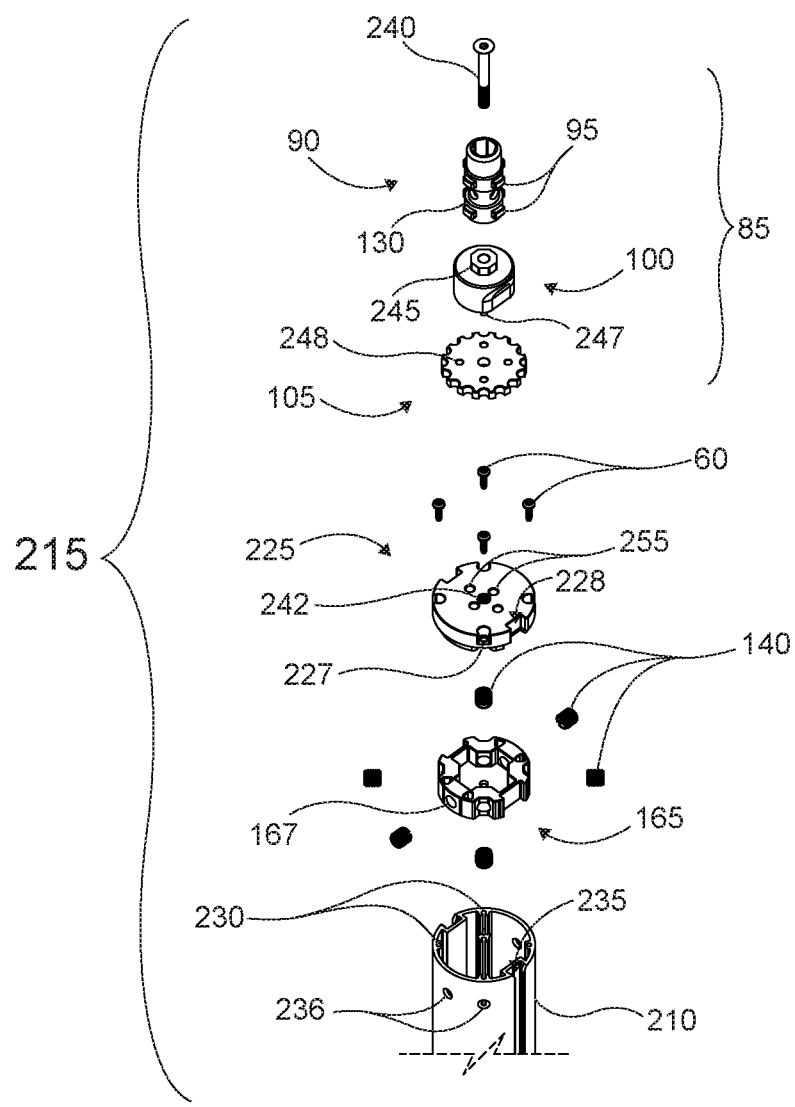
FIG. 5 is an exploded perspective view of a housing male end of the telescoping module shown in FIG. 4.

As illustrated in FIG. 5, the housing male end 215 comprises a male flat-mount end plate 225 fastened to extension-tube housing 210 by screws 60 passed through unthreaded bores 227 for threadable engagement within thread-forming slots 230. Once assembled, channel openings 228 in the male flat-mount end plate 225 allow for passage of T-nuts into the nut/conduit channels 235, provided for secure attachment of additional male ends or other components along the length of the extension-tube housing 210, where not otherwise occupied by a controls conduit 20. For this same purpose, as previously described in reference to FIG. 3, the extension-tube housing 210 may also have secured within its inner contours, a tube-middle threaded insert mount 165 comprising a plurality of threaded insert holes 167 wherein threaded inserts 140 may be provided for attachment of additional male member side-mount assemblies or other components (not shown) by a bolt or screw passed through side-mount bores 236 for threadable engagement with a corresponding threaded insert 140.

The housing male end 215 also comprises a male member flat-mount assembly 85, as mentioned previously, here secured to the male flat-mount end plate 225 by a bolt 240 threadably engaged with a center threaded bore 242 or threaded insert located at the center of the end plate 225. The male member flat-mount assembly 85 is assembled using the bolt 240 passed through the center of the male component 90, thereby securing the male component 90 against the wide pivot component 100 and octagonal boss 245 engaged within the octagonal recess 246 (visible in FIG. 6) in the proximal end of the male component 90. The wide pivot component 100 is engaged next with the flat-mount pivot-lock sprocket 105 where they are held together by teeth 247 on the bottom of the wide pivot component 100 inserted into tooth holes 248 in the face of the flat-mount pivot-lock sprocket 105. The assembly 85 is aligned against the outward face of the male flat-mount end plate 225 by pegs 252 on the bottom of the flat-mount pivot-lock sprocket 105 (visible in FIG. 6) inserted into peg holes 255 in the face of the end plate 225 where, with the bolt 240 passed through the center of the three components, the male member flat-mount assembly 85 can be demountably secured to the end plate 225.

Figure 6:
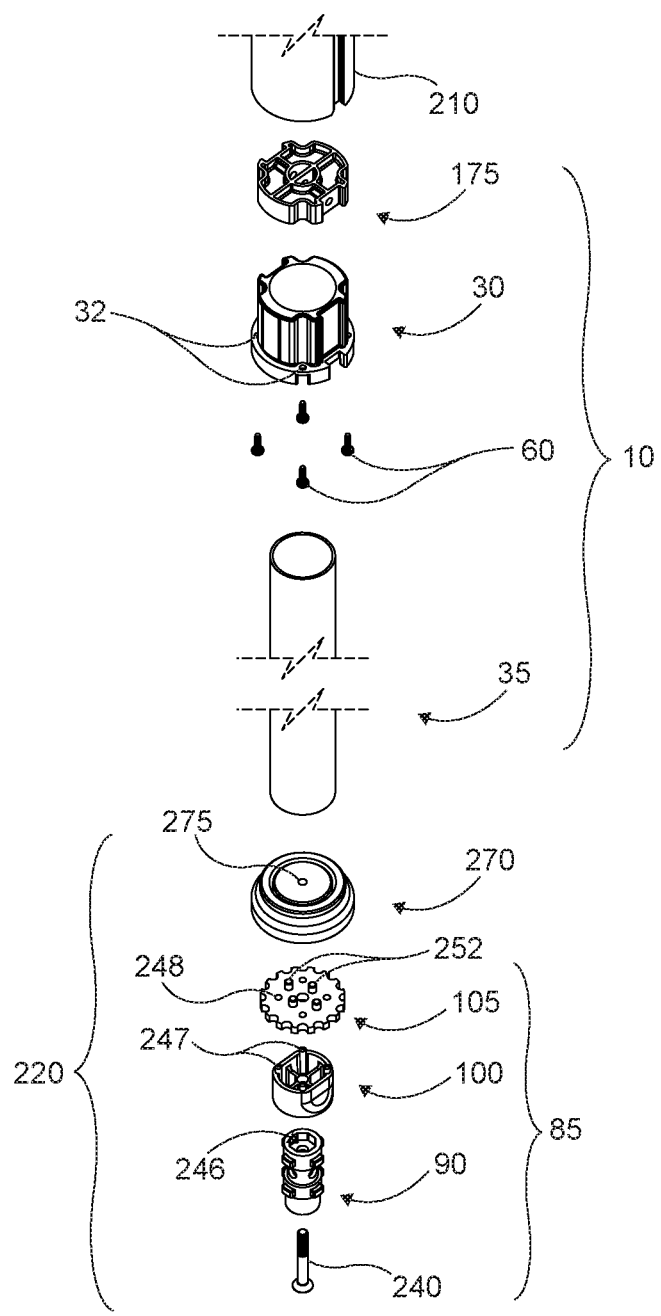
FIG. 6 is an exploded perspective view of an extender male end and cooperating telescoping assembly of the telescoping module shown in FIG. 4.

As illustrated in FIG. 6, the telescoping module with male ends 200 also comprises an extender male end 220 at the distal end of telescoping assembly 10 extending from within extension-tube housing 210. An extender male end adapter 270 is secured directly or indirectly to the extender 35 by a bolt in to the center threaded bore 275, or by other means of attachment (not shown). An outwardly facing male member flat-mount assembly 85 may be mounted as described previously by a bolt 240 passed through the center bores of the male assembly components for threadable engagement with the outward-facing end of the center threaded bore 275 or threaded insert located at the center of the end adapter 270.

An example of a third type of telescoping module is illustrated in FIGS. 7A and 7B, wherein a telescoping module with a female end and a male end 280 generally comprises a telescoping assembly 10 securely contained within the first extension-tube housing 15, wherein it may be controlled by a control box 25 through a controls conduit 20. At the distal end of the extension-tube housing 15, the telescoping module 280 comprises the housing female end 45 with receptacle 40, for connection with another module of the system having a male end as disclosed herein or in International Application No. PCT/CA2017/050376. At the distal end of an extender 35, the telescoping module 280 also comprises the extender male end 220 with male member flat-mount assembly 85 for engagement with another module's receptacle. Alternatively, the receptacle 40 may be provided at the distal end of the extender 35, and the male end assembly 85 may be provided at the distal end of the extension-tube housing 15. FIG. 7A shows the telescoping module 280 in an extended position with the extender 35 at a maximum length of extension out of the extension-tube housing 15 passed through the extension-tube end guide 30, while FIG. 7B shows the telescoping module 280 with the extender 35 fully retracted into the extension-tube housing 15.

Figure 8A:
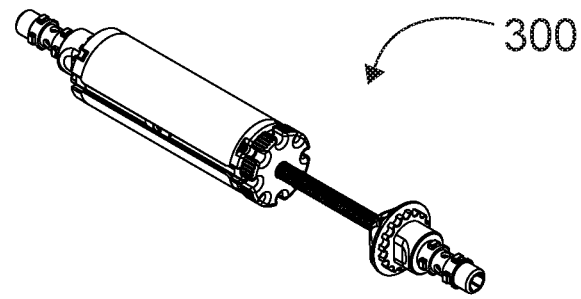
Figure 8B:
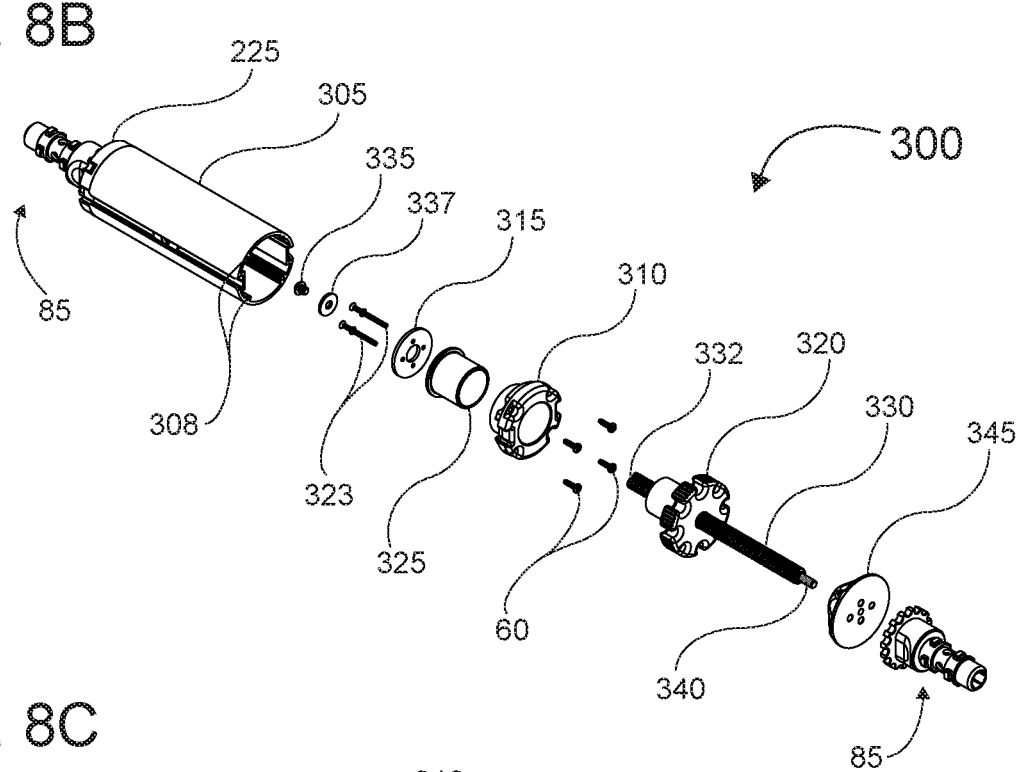
Figure 8C:
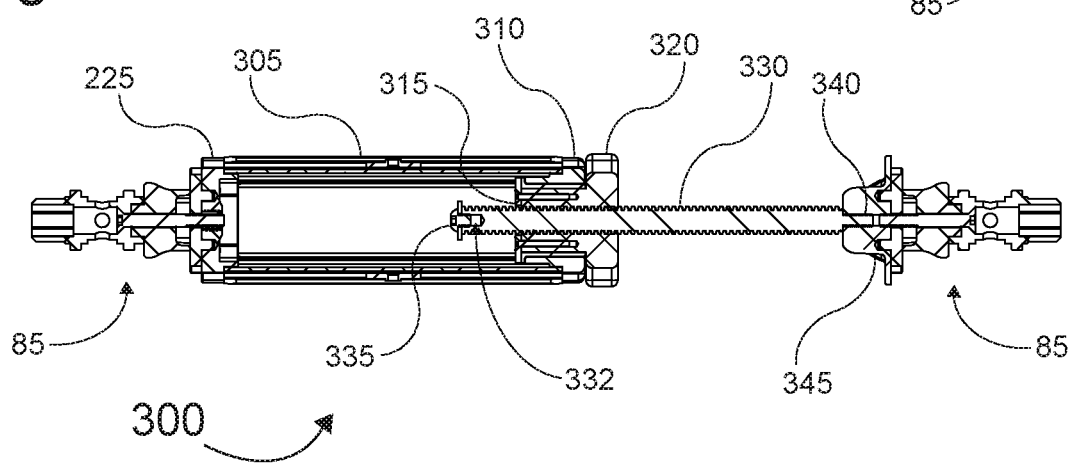

An example of a threaded-rod telescoping module 300 is illustrated in FIGS. 8A, 8B, and 8C (perspective, exploded perspective, and longitudinal cross-sectional view, respectively) and generally comprises a fourth example of an extension-tube housing 305 having secured at one end by screws 60 threadably engaged with thread-forming slots 308, a male flat-mount end plate 225 to which is mounted a male end assembly 85. The other end of the extension-tube housing 305 is fitted with a telescoping assembly comprising a retaining component 310 which is mounted to the end of the extension-tube housing 305 using four screws 60. A retaining plate 315 is fastened against the inner-facing end of a rod-adjustment component 320 with screws 323. The inner section of the rod-adjustment component 320 passes through the center of the retaining component 310, separated by a bushing 325. The rod-adjustment component 320 and retaining plate 315 are rotationally engaged with the the retaining component 310 which secures the assembly within the extension-tube housing 305 with screws 60 at thread-forming slots 308. The rod-adjustment component 320 has a threaded bore therethrough which threadably engages a threaded rod 330. The enclosed end of the threaded rod 330 is provided with a rod-end threaded bore 332 wherein a rod-end screw 335 is threadably engaged to secure a washer 337 providing a stopper to prevent over-extension and accidental separation of the threaded rod 330 from the rod-adjustment component 320.

The outer end of the threaded rod 330 has a narrower diameter second-threaded portion 340 whereon a threaded-rod male mount adapter 345 is threadably engaged at a center threaded bore. With a bolt or a screw, a male member flat-mount assembly 85 is demountably engaged with the outward face of the adapter 345, at a center threaded bore, for engagement of the telescoping assembly 300 with a female end of another module of the system as disclosed herein or in International Application No. PCT/CA2017/050376.

An operator may extend the male mount adapter 345 and male end assembly 85 away from the other sections of the module 300 by clockwise rotation of the rod-adjustment component 320, which advances outwardly the threaded rod 330 until a desired outward extension of the male end assembly 85 is achieved. An operator may reversibly retract the male end assembly 85 by rotating the rod-adjustment component 320 in a counter-clockwise direction.

Figure 14:
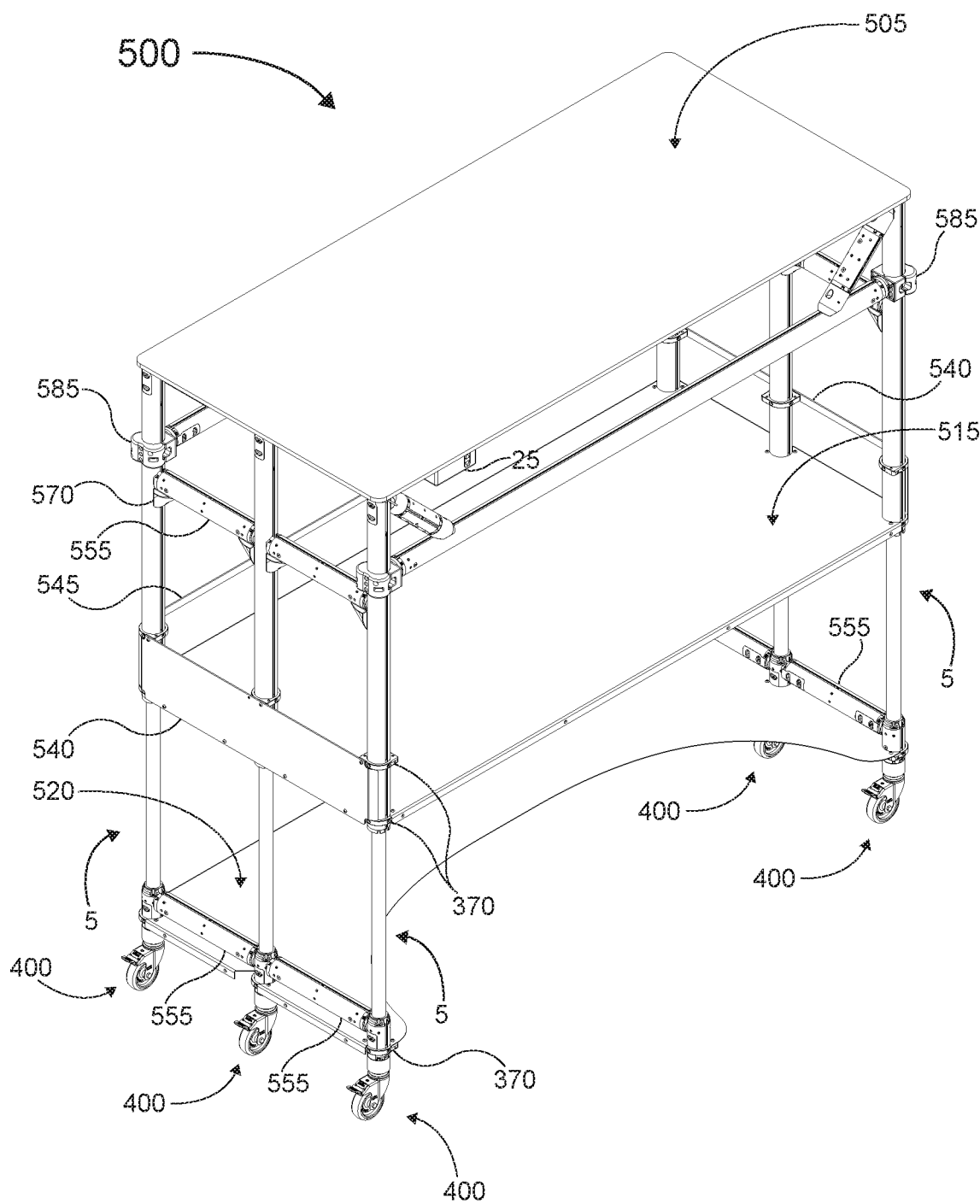
FIG. 14 is a whole perspective view of the height-adjustable work platform from FIG. 13, shown with the telescoping modules in an extended position.
Figure 15:
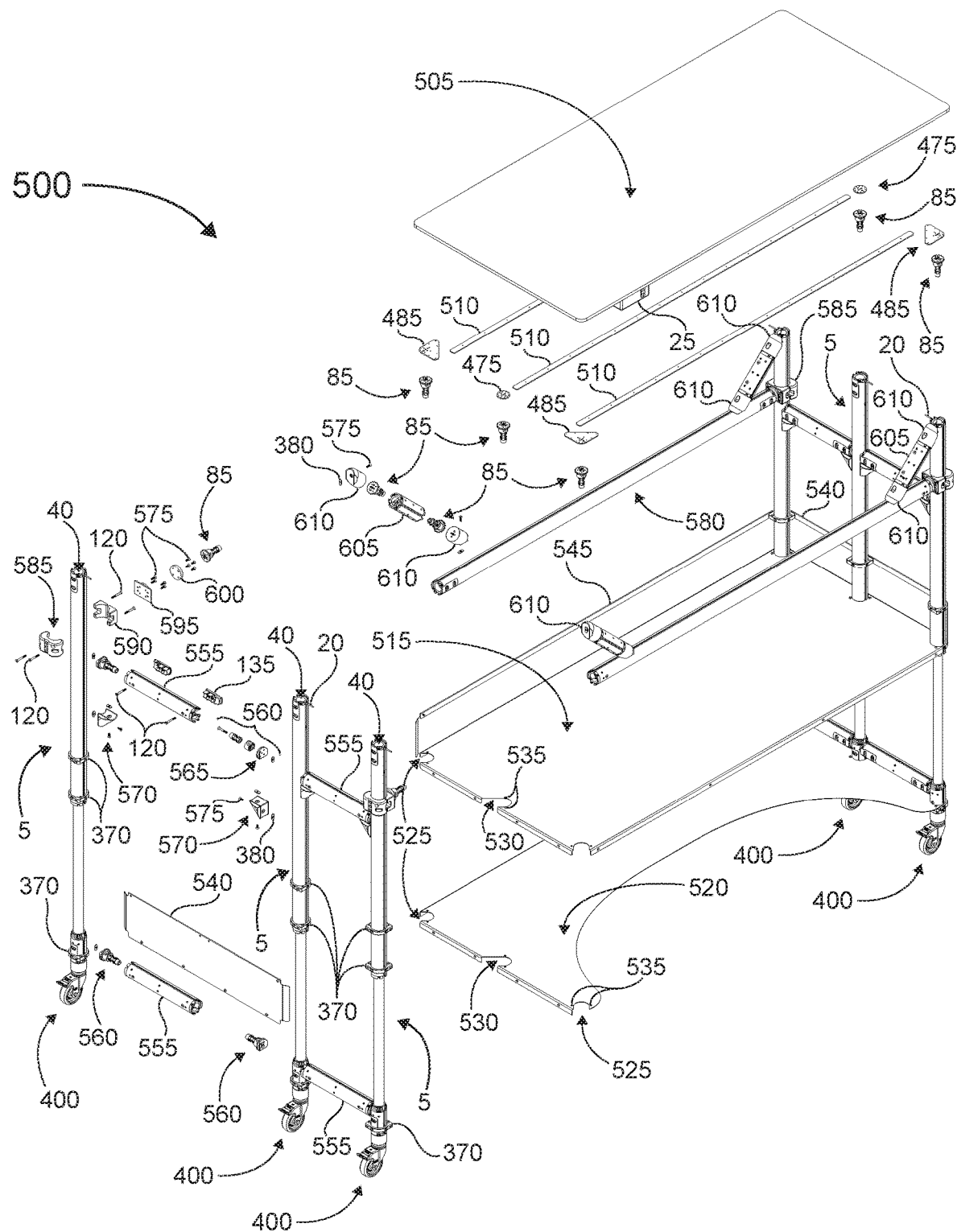
FIG. 15 is a partially exploded perspective view of the height-adjustable work platform from FIGS. 13 and 14 showing some aspects of the present disclosure wherein female ends and male ends are mounted to the ends of or to the cylindrical sides of the modules.

It is to be noted that the present male member flat-mount assembly 85, and male member side-mount assembly 560 described below in reference to FIG. 15, are configured for rotatable or locked engagement with the rotator receptacles "11" shown in FIGS. 1, 4, etc. of International Application No. PCT/CA2017/050376. It is to be noted that the present male member flat-mount assembly 85 and male member side-mount assembly 560 are also configured for demountable engagement with the joiner receptacles "211" shown in FIGS. 6, 17, etc. of International Application No. PCT/CA2017/050376. It is to be noted that the present male member flat-mount assembly 85 is also configured for demountable engagement with the 45° side-mount bracket module "350", male member mounting block modules "355", "356", "357", "358", "359", "360", the 5° increment adjustable male member mount module "380", and the male mount slider component "450" shown in FIGS. 13, 14, 15, 17, as well as with a castor wheel module "560", a leveling foot module "580", an end-cap module "625", or a male dome pad end-cap module "650" shown in FIGS. 23, 24, 28, and 30 of International Application No. PCT/CA2017/050376.

The retracted length of the telescoping modules disclosed herein may be, for example, 6", 12", 18", 24", 32", 36", 42", 48", 60", 72", 84", 96" and therebetween. The retracted length of the telescoping modules disclosed herein may be, for example, 15 cm, 30 cm, 45 cm, 60 cm, 81 cm, 91 cm, 106 cm, 122 cm, 150 cm, 180 cm, 210 cm, 240 cm, and therebetween. It is suitable to adjust the width of the present telescoping modules to increase proportionally with an increase in the length of the telescoping modules to maintain and preserve the robustness, stability, and durability of the telescoping modules when in use. It is suitable to adjust the dimensions of the female end components and the male end components in proportion to the width and length of the telescoping modules to maintain and preserve the robustness, stability, and durability of the telescoping modules when in use.

It is to be noted that a telescoping assembly may include any of a controllably extendible and retractable pneumatic cylinder or a hydraulic cylinder or a multi-stage telescoping mechanism controlled by an electrical motor. Such telescoping assemblies are also commonly referred to as "height-adjustable" components used to raise and lower, for example, desks and work stations. Information on such height-adjustable components can be found, for example, at http://www.heightadjustabledeskadvice.com/, and in U.S. Pat. Nos. 6,595,144; 7,934,459; 9,003,979; 6,655,438; 9,655,445, among others. The key features that differentiate the present telescoping modules disclosed herein from the known height-adjusting components is the integration of the female end components disclosed herein with one or both ends of the known height-adjusting components, and the integration of the male end components disclosed herein with one or both ends of the known height-adjusting components. Particularly suitable known height-adjusting components for integration with the female end components and the male end components disclosed herein are height-adjusting components that meet and surpass the minimum standards set by the Business and Institutional Furniture Manufacturers Association (BIFMA), which is a subgroup under the American National Standards Institute (ANSI).

It is to be noted that the degree and speed of extension/retraction of some examples of the pneumatically controlled and hydraulically controlled telescoping modules disclosed herein may be manually controlled by an operator, or alternatively with a control box 25 which communicates via a controls conduit 20 with an extension/retraction mechanism contained within an extension-tube housing. It is to be noted that some examples of electrically controlled telescoping modules disclosed herein may be manually controlled by an operator, or alternatively, with a control box 25 which communicates via a controls conduit 20 with an extension/retraction mechanism contained within an extension-tube housing, or alternatively for example, by wireless transmission of signals from a remote control box to a receiver on the telescoping module that is in electrical combination with the extension/retraction mechanism.

The telescoping modules disclosed herein can be combined with a variety of modules disclosed in International Application No. PCT/CA2017/050376 to quickly configure useful and sturdy utility assemblies on a job site or an office site or an industrial site or a retail site or in a home environment.

To gain a better understanding of the embodiments disclosed herein, the following examples of utility system assemblies and support structure assemblies are described.

EXAMPLES

Example 1: Height-Adjustable Utility Cart Assembly

Figure 9:
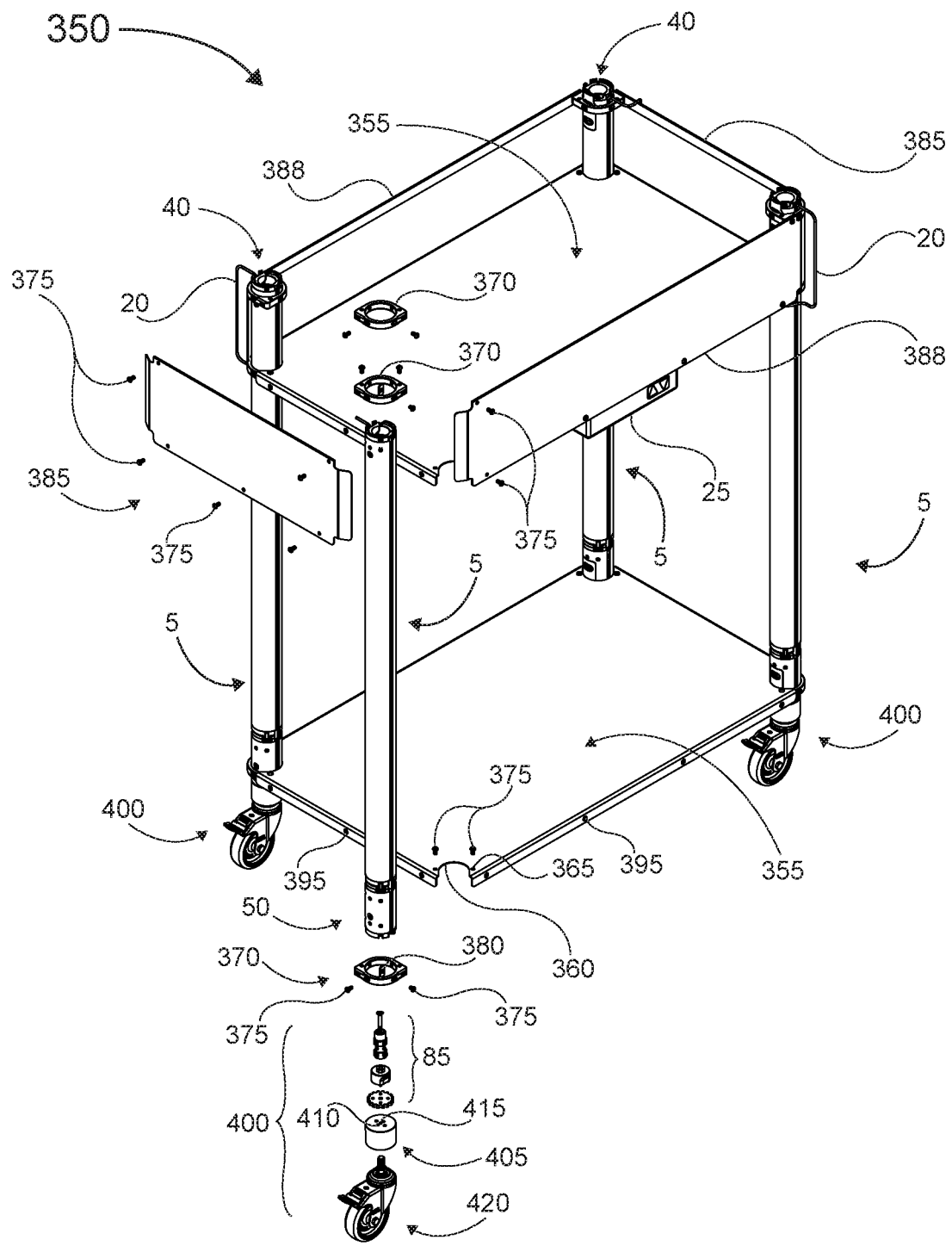
FIG. 9 is a partially exploded perspective view of an example of a height-adjustable cart showing some aspects of the present disclosure wherein the telescoping modules are in a retracted position.
Figure 10:
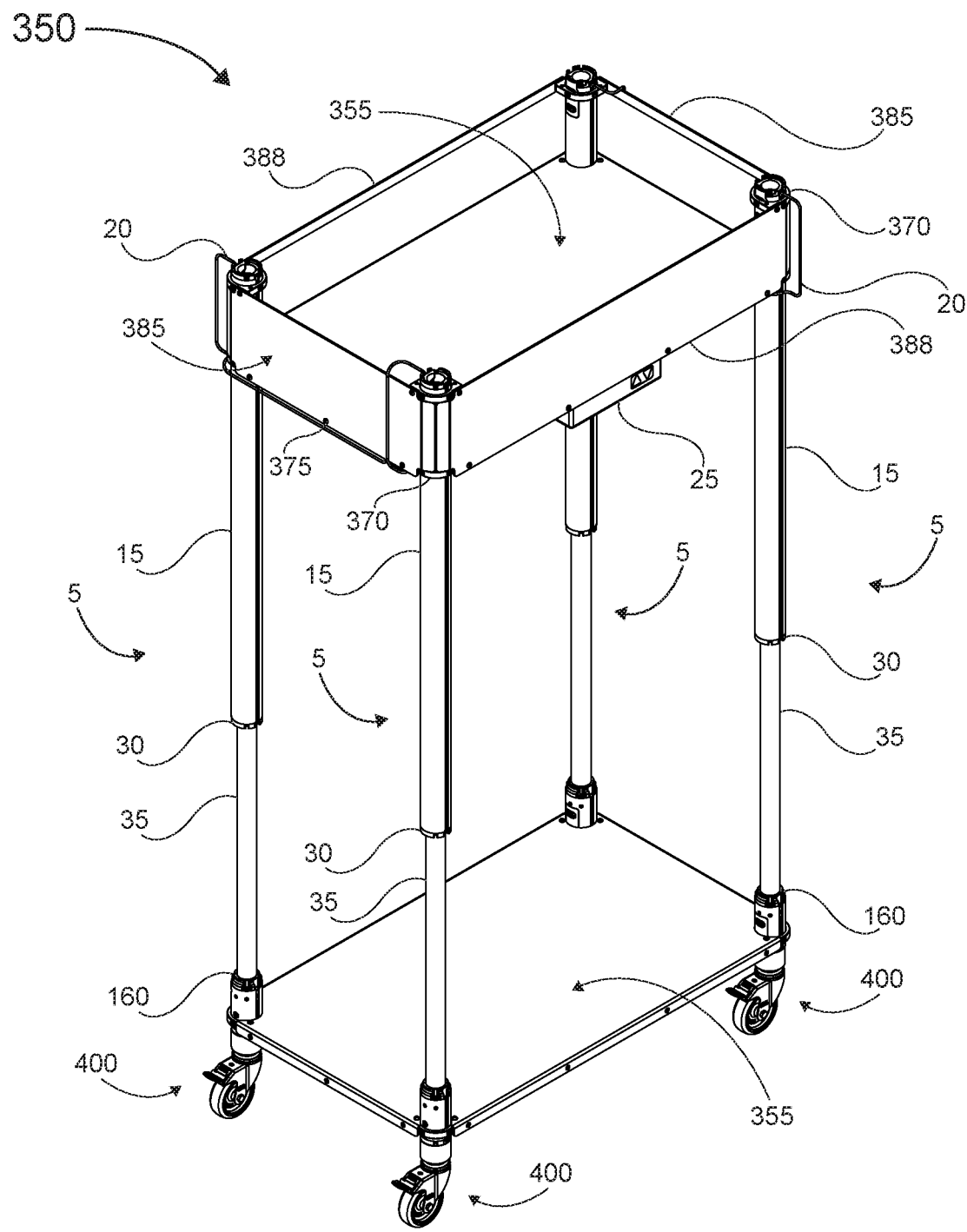
FIG. 10 is a perspective view of the height-adjustable cart from FIG. 9, shown with the telescoping modules in an extended position.

An example of a rolling height-adjustable utility cart assembly that may be quickly assembled by incorporating the telescoping modules with certain other modules of the system, as disclosed herein and in International Application No. PCT/CA2017/050376, is shown in FIGS. 9 and 10 (lowered and raised positions, respectively). The utility cart assembly 350 provides a lower open tray assembly and an upper box tray assembly for transporting equipment, properties, materials, supplies, and the like around a worksite or other location, movable by pushing or pulling the utility cart in any direction on the four 360° pivotable caster wheel modules 400. Alternatively, in place of wheel modules, similar assemblies may be configured with other modules of the system at its base for standing shelf and storage assemblies, such as foot modules "580", "585", "590" or end-cap components "680" shown in FIGS. 24, 25, and 33 of International Application No. PCT/CA2017/050376.

In this example, four telescoping modules with female ends 5 form the height-adjustable frame of the utility cart assembly 350. Secured from these corner telescoping modules 5 are two tray assemblies, each having a first example of a tray bottom 355 with corner openings 360 at all four corners wherein the four telescoping modules 5 can be aligned and therein secured by collars 370. As illustrated in FIG. 9, each telescoping module 5 is first engaged with two collars 370 by screws 375 into side-mount bores, and screws 375 with T-nuts 380 into the nut/conduit channels, where they are secured on the lengths of the telescoping modules 5 just below each desired tray bottom mounting position. From under the tray bottoms 355 and into the openings 360, the modules 5 with collars 370 can be inserted and there secured to the tray bottoms 355 by screws 375 passed through collar screw holes 365 for threadable engagement with threaded bores in the top-faces of the collars 370.

As shown with the upper tray assembly, up to four side panels 385, 388 can be secured by screws 375 threadably engaged with side-panel screw holes 395 in the side edges of the tray bottom 355 and in the sides of the collars 370 thereto attached. For added stability of the side panels 385, 388, an additional set of four collars 370 can be secured to the telescoping modules 5 where the bores in the top corners of the side panels align and screws 375 can be threadably engaged with bores in the sides of the collars 370 thereby providing additional reinforcement of the tray assembly.

In each of the four corners of the utility cart assembly 350, a caster wheel module 400 is demountably engaged by its male member flat-mount assembly 85 within the bottom end receptacle of each telescoping module 5, to allow for rolling movement of the utility cart assembly. In this example, the castor wheel module 400 comprises a male member flat-mount assembly 85 secured to the top-face of a mount component 405. The male member flat-mount assembly 85 is first aligned against the top-face of the mount component 405 by pegs 252 on the bottom of the flat-mount pivot-lock sprocket (visible in FIG. 6) inserted into peg holes 410 in the top-face of the mount component 405 where, with a bolt passed through the center of the three components and threadably engaged with the center threaded bore 415 or threaded insert located at the center of the mount component 405, the male member flat-mount assembly 85 is demountably secured. A castor wheel 420 is rotationally engaged with the mount component 405 by mount screw or other means of attachment with the underside of the mount component 405.

In this example, the height of the upper tray assembly can be raised or lowered on the telescoping modules 5 which are extendible and retractable by operations of the control box 25 transmitted to the telescoping modules via their controls conduit 20.

It is to be noted that, if so desired, one or more additional tray assemblies may be included in the utility cart assembly 350 below the upper tray assembly on the lengths of the telescoping modules 5 above the extension-tube end guides 30, or above the telescoping modules 5 on additional lengths of extension-tube housing modules (not shown) as disclosed in International Application No. PCT/CA2017/050376, having male ends to be secured within the four upper receptacles 40. When an additional tray assembly is to be located on additional modules above the upper tray bottom 355 and the user wishes to controllably change the separation of the adjacent tray bottoms, a set of four telescoping modules 200 or 280 may be incorporated into the assembly at the available receptacles 40. In this case, the extension/retraction of each set of four telescoping modules 200 or 280 would be separately controllable with a separate control box for each set of modules.

Example 2: Height-Adjustable Work Station Assembly

Figure 11:
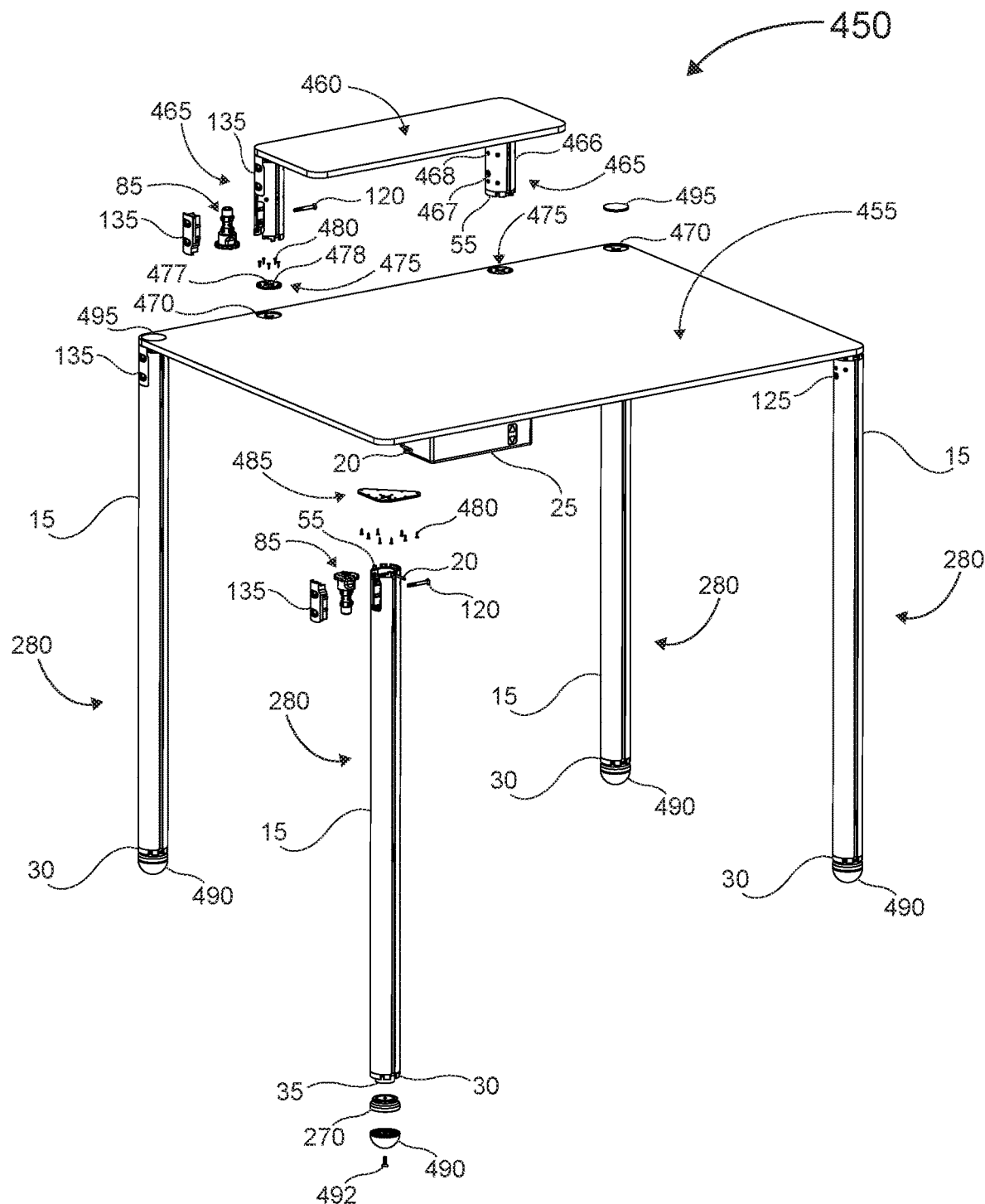
FIG. 11 is a partially exploded perspective view of an example of a height-adjustable work station showing some aspects of the present disclosure wherein the telescoping modules are in a retracted position.
Figure 12:
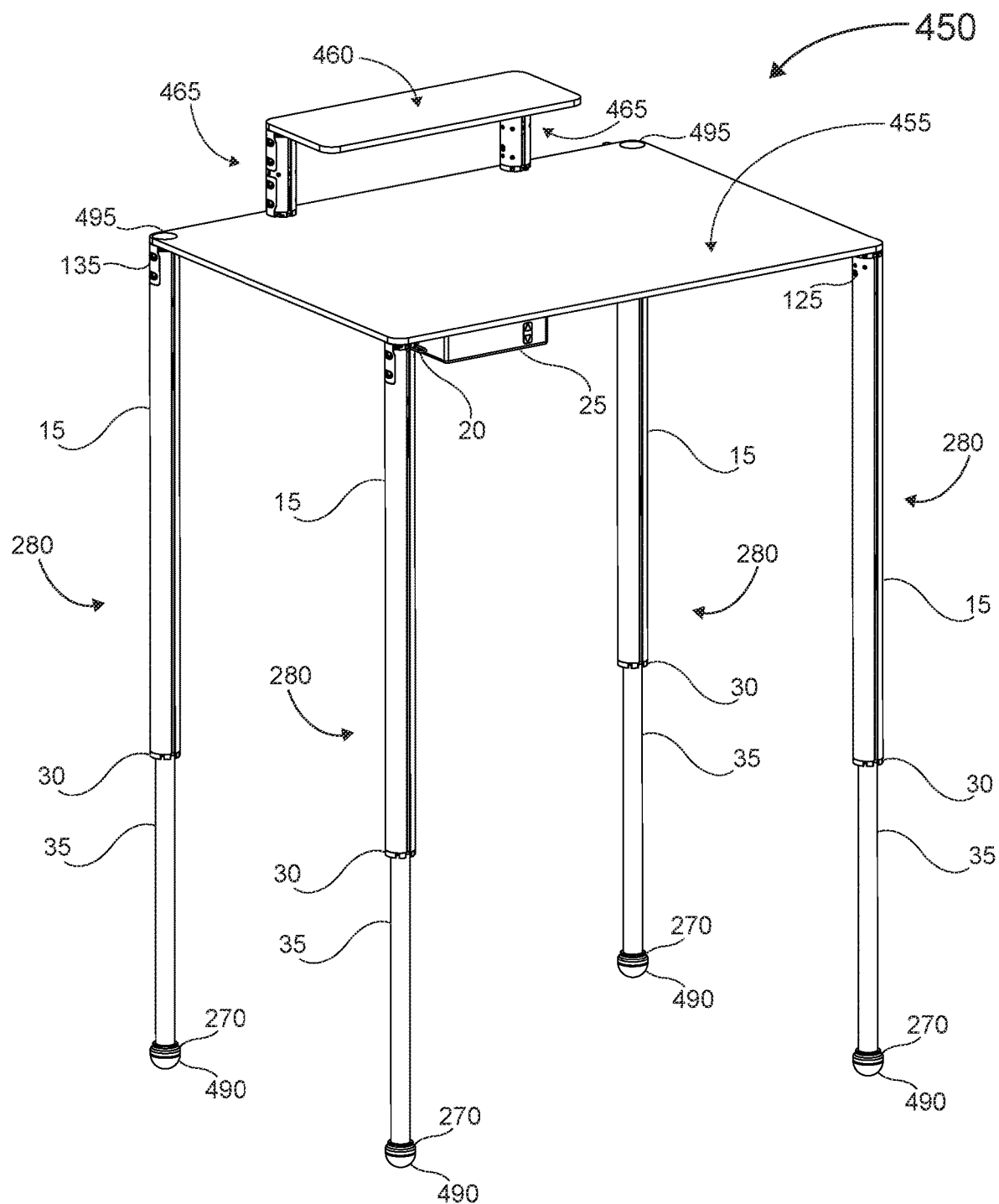
FIG. 12 is a perspective view of the height-adjustable workstation from FIG. 11, shown with the telescoping modules in an extended position.

An example of a height-adjustable work station assembly 450 that may be quickly assembled by incorporating the telescoping modules with certain other modules of the system, as disclosed herein and in International Application No. PCT/CA2017/050376, is shown in FIGS. 11 and 12 (lowered and raised positions, respectively).

This example comprises a rectangular desk top 455, and a rectangular shelf 460 situated above the desk top 455. Mounting plate recesses 470 are provided in the top surface of the desk top 455, wherein two circular mounting plates 475 may be secured by plate screws 480 through screw bores 478 or other means of attachment with the surface of the desk top 455. Additionally, two circular mounting plates 475 are secured within two mounting plate recesses (not shown) in the bottom surface of the shelf 460. Each of four male member flat-mount assemblies 85 is securely engaged with a mounting plate 475 by a bolt threadably engaged with the center threaded bore 477 in each mounting plate 475. The lower ends of two of a first example of a double-receptacle side-opening module 465 each comprising a fifth example of an extension-tube housing 466 with a tube bore 467 and side-mount bores 468, are then engaged with the upward-extending male member flat-mount assemblies 85 secured to the top surface of the desk top 455, and secured in place by bolts 120 passed through tube bores 467 and the male components therein for threadable engagement with threaded bores or threaded inserts (not shown) in the proximal sides of the side-opening receptacle covers 135. Likewise, the upper ends of the double-receptacle side-opening modules 465 are engaged with the downward-extending male member flat-mount assemblies 85 secured to the bottom of the shelf 460, and secured in place by bolts 120 threadably engaged with side-opening receptacle covers 135.

It should be noted that a mounting plate may be circular or oblong or triangular or square or rectangular or trapezoidal or hexagonal or octagonal in shape and may provide varying numbers of screw bores 478 or other means of attachment with a surface. The bottom surface of the desk top 455 is provided with four triangular mounting plate recesses (not shown) near each of the corners of the desk top 455. Each recess is configured to receive therein a triangular mounting plate 485 secured to the bottom surface of the desk top 455 by plate screws 480 through bores, or other means of attachment. Four male member flat-mount assemblies 85 are each securely engaged with a triangular mounting plate 485 by a bolt threadably engaged with the center threaded bore in each mounting plate. Four of the telescoping modules with a female end and a male end 280 may each be securely mounted thereon a male member flat-mount assembly 85 by bolts 120 and side-opening receptacle covers 135, providing thereby the height-adjustable leg components of the work station assembly 450. The bottom male member flat-mount assemblies 85 of the telescoping modules 280 are, in this example, removed and replaced by four end-caps 490 secured to the modules' extender male end adapters 270 by screws 492, thereby providing foot components. In this example, the height of the desk top surface can be raised or lowered on the telescoping modules 280 which are extendible and retractable by operations of the control box 25 transmitted to the telescoping modules via their controls conduit 20.

Similarly, rolling work station assemblies may be configured by including caster wheel modules 400, for example, in place of end-caps 490 or other foot modules, in assemblies wherein telescoping modules with receptacles or additional modules with receptacles are provided at the bottom ends.

Where a larger shelf or two smaller shelves are provided in similar assemblies, two additional mounting plate recesses 470 are provided in the back corners of the desk top 455 for attachment of the circular mounting plates 475 and male member flat-mount assemblies 85, and additional modules thereon. When not in use, a recess 470, for aesthetic purposes, may have inserted a desk top recess cap 495 provided for closure of the recess.

It is to be noted that the desk tops or table tops or shelves or staging of similar assemblies may be square, rectangular, trapezoidal, triangular, pentagonal, hexagonal, heptagonal, octagonal, decagonal, circular, kidney-bean shaped, wave-shaped, and may have other forms of symmetrical and asymmetrical curvilinear shapes. Although it will be most common that these modular assemblies are provided with four legs, it is optional to provide three legs for a triangular top surface, for example, or two A-frame legs on two sides of a top surface, or a single weighted or broadly footed center leg, to assemble a variety of modular configurations.

Example 3: Height-Adjustable Platform Assembly

Figure 13:
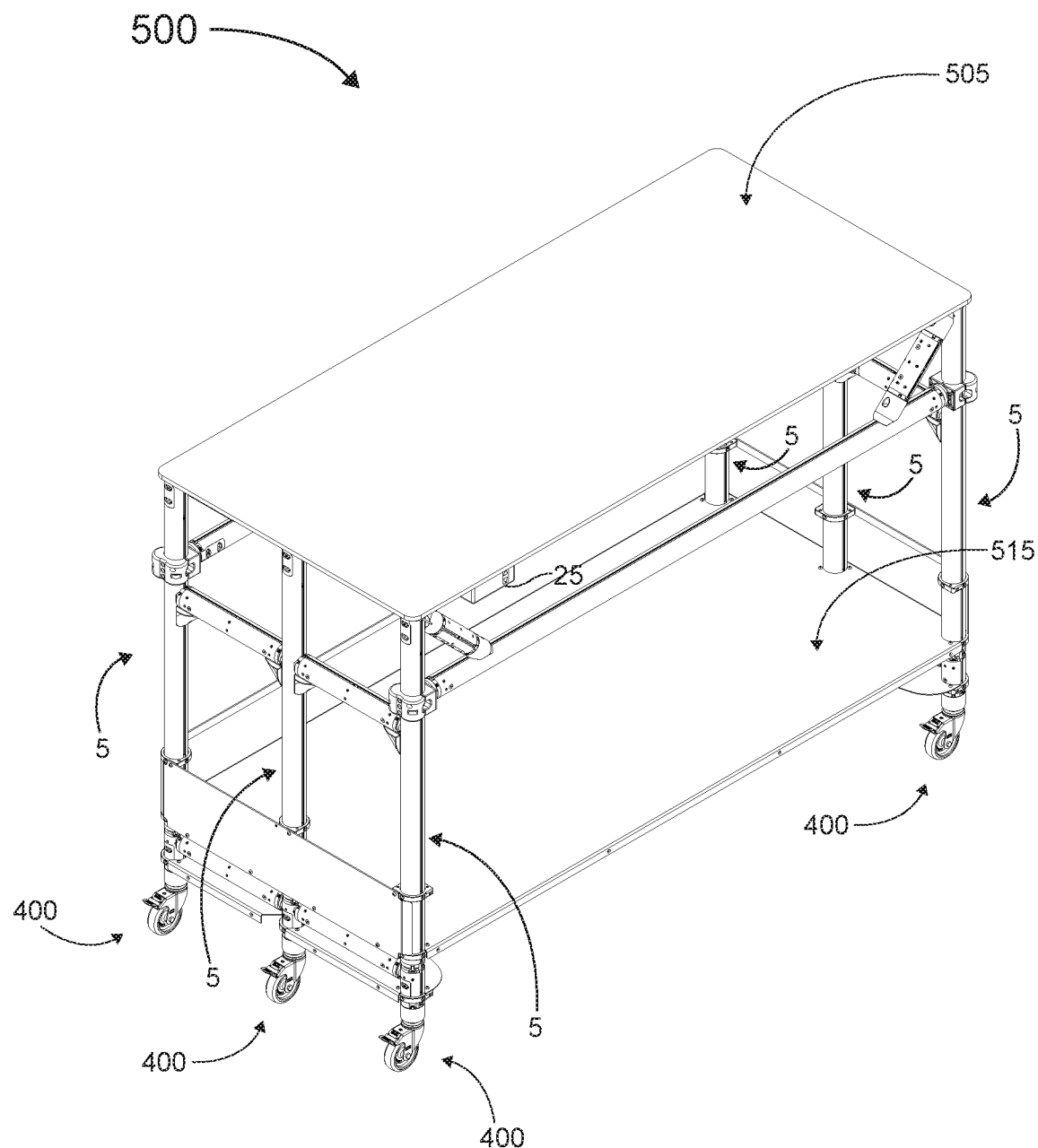
FIG. 13 is a whole perspective view of an example of a height-adjustable work platform showing some aspects of the present disclosure wherein the telescoping modules are in a retracted position.

An example of a height-adjustable platform assembly 500 that may be quickly assembled by incorporating the telescoping modules with certain other modules of the system, as disclosed herein and in International Application No. PCT/CA2017/050376, is shown in FIGS. 13, 14, and 15 (lowered, raised, and raised exploded views, respectively).

This example comprises a rectangular platform 505 mounted to the receptacles 40 in the upper ends of six telescoping modules with female ends 5, by male end assemblies 85 and mounting plates 475, 485 as described above in reference to Example 2. To add strength and rigidity to the platform 505, platform stiffeners 510 may be inserted and fastened into corresponding recesses in the underside of the platform using screws and/or adhesive and/or other means of attachment.

A second example of a tray bottom 515 and third and fourth examples of side panels 540 and 545 are secured to pairs of collars 370 at the lower ends of the raise-able extension-tube housing sections of the six telescoping modules 5 thereby secured within corner openings 525 and middle openings 530 along the outer periphery of the tray bottom 515 using screws passed through collar screw holes 535 and threadably engaged with threaded bores in the top sides of the corresponding collars 370, as described above in reference to Example 1. A third example of a tray bottom 520 is shown mounted by the same means as above to collars 370 secured to the bottom section extender female ends of the six telescoping modules 5.

To increase the strength and rigidity of the overall assembly, bracing modules may also be incorporated into the assembly as illustrated or in other similar arrangements. In this example, the sets of three telescoping modules 5 which form the two short sides of the assembly are reinforced by four of a second example of a double-receptacle side-opening module 555, each demountably engaged with two of an example of a male member side-mount assembly 560 having the same male component 90 and wide pivot component 100 as previously described but wherein the flat-mount pivot-lock sprocket 105 is replaced with a concave pivot-lock sprocket 565 allowing for the male assembly 560 to be mounted to the cylindrical side of an extension-tube housing module using a bolt or screw threadably engaged with a T-nut securely held within the nut/conduit channels of the extension-tube housing, or optionally, a threaded insert corresponding with a side-mount bore. For further reinforcement, frame corner braces 570 are fastened by screws 575 engaged with T-nuts 380 held in the nut/conduit channels of the intersecting side-opening modules 555 and telescoping modules 5.

For an even greater structural integrity of the platform assembly 500, the long sides of the assembly are reinforced by two of a third example of double-receptacle side-opening module 580 demountably engaged to each of the corner telescoping modules 5 at a male member flat-mount assembly 85 affixed to the telescoping modules 5 by a sub-assembly of components comprising an example of a multi-angle male member mount bracket 585 engaged using bolts 120 with an example of plate wedges 590 having fastened by screws 575 thereon a bracket mount plate 595 and male mount spacer plate 600 whereon the male assemblies 85 are provided. Optionally, as illustrated, diagonal bracing may also be provided, in this assembly 500 using four of a fourth example of double-receptacle side-opening module 605 each supported by two of an example of a 45° offset side-mount male bracket 610 each with a demountably engaged flat-mount male assembly 85 and secured to corresponding nut/conduit channels by screws 575 and T-nuts 380.

In each of the four corners of the platform assembly 500, a caster wheel module 400 is demountably engaged by its male member flat-mount assembly 85 within the bottom end receptacle of each telescoping module 5 to allow for rolling movement of the platform assembly 500. Similar static assemblies may be also configured by including end-caps 490, for example, or other foot modules, in place of wheel modules in assemblies where telescoping modules with extender male end adapters 270 or additional modules with male flat-mount end plates 225 are provided at the bottom ends.

In this example, the height of the platform and middle tray bottom 515 can be raised or lowered on the telescoping modules 5 which are extendible and retractable by operations of the control box 25 transmitted to the telescoping modules via their controls conduit 20. Similar assemblies as Example 3 may be configured also for height-adjustable bedframe systems and the like.

NUMBERING KEY

5—telescoping module with female ends (FIGS. 1-3)
10—telescoping assembly
15—first extension-tube housing
20—controls conduit
25—control box
30—extension-tube end guide
32—unthreaded bores
35—extender
40—receptacle
45—housing female end
50—extender female end
55—side-opening receptacle socket
60—screws
65—unthreaded bores
70—thread-forming slots
75—side channels
80—nut/conduit channels
85—male member flat-mount assembly
90—male component
95—prongs
100—wide pivot component
105—flat-mount pivot-lock sprocket
110—male member channels
115—prong-retaining slots
120—bolt
125—tube bore
130—unthreaded bore
135—side-opening receptacle cover
140—threaded insert
145—hex nuts
150—side-mount bores
152—channel openings
155—second extension-tube housing
160—extender female end adapter
161—unthreaded bores
163—thread-forming slots
164—nut/conduit channel
165—tube-middle threaded insert mount
167—threaded insert holes
170—side-mount bores
175—telescoping assembly mount
180—mounting bore
200—telescoping module with male ends (FIGS. 4-6)
210—third extension-tube housing
215—housing male end
220—extender male end
225—male flat-mount end plate
227—unthreaded bores
228—channel openings
230—thread-forming slots
235—nut/conduit channels
236—side-mount bores
240—bolt
242—center threaded bore
245—octagonal boss
246—octagonal recess
247—teeth
248—tooth holes
252—pegs
255—peg holes
270—extender male end adapter
275—center threaded bore
280—telescoping module with a female end and a male end (FIG. 7)
300—threaded-rod telescoping module (FIG. 8)
305—fourth extension-tube housing
308—thread-forming slots
310—retaining component
315—retaining plate
320—rod-adjustment component
323—screws
325—bushing
330—threaded rod
332—rod-end threaded bore
335—rod-end screw
337—washer
340—second threaded portion
345—threaded rod male mount adapter
350—height-adjustable utility cart assembly (FIGS. 9,10)
355—first tray bottom
360—corner opening
365—collar screw holes
370—collar
375—screws
380—T-nut
385—first side panel
388—second side panel
395—side panel screw holes
400—caster wheel module
405—mount component
410—peg holes
415—center threaded bore
420—caster wheel
450—height-adjustable work station assembly (FIGS. 11,12)
455—desk top
460—shelf
465—first double-receptacle side-opening module
466—fifth extension-tube housing
467—tube bore
468—side-mount bores
470—mounting plate recess
475—circular mounting plate
477—center threaded bore
478—screw bores
480—plate screws
485—triangular mounting plate
490—end-cap
492—end-cap screw
495—desk top recess caps 500—height-adjustable platform assembly (FIGS. 13-15)
505—platform
510—platform stiffener
515—second tray bottom
520—third tray bottom
525—corner opening
530—middle opening
535—collar screw holes
540—third side panel
545—fourth side panel
555—second double-receptacle side-opening module
560—male member side-mount assembly
565—concave pivot-lock sprocket
570—frame corner brace
575—screws
580—third double-receptacle side-opening module
585—multi-angle male member mount bracket
590—plate wedges
595—bracket mount plate
600—male mount spacer plate
605—fourth double-receptacle side-opening module
610—45° offset side-mount male bracket

The invention claimed is:

1. A portable telescoping module for use in demountably configuring a structural assembly having a plurality of demountably engaged portable modules, the telescoping module comprising:
a first elongate telescoping support component comprising a housing element with a first female end extending outward therefrom and an extender element housed within the housing element and extending outward therefrom, said extender element having an outward extending second female end opposed to the first female end, said extender element extendible outward from and retractable into the housing element, said housing element additionally comprising one or more nut channels provided therealong for slidingly receiving and retaining therein one or more threadably engageable nuts provided for demountable engagement of another portable module; or
a second elongate telescoping support component comprising a housing element with a first male end extending outward therefrom and an extender element housed within the housing element and extending outward therefrom, said extender element having an outward extending second male end opposed to the first male end, said extender element extendible outward from and retractable into the housing element, said housing element additionally comprising one or more nut channels provided therealong for slidingly receiving and retaining therein one or more threadably engageable nuts provided for demountable engagement of another portable module; or
a third elongate telescoping support component comprising a housing element with a female end extending outward therefrom and an extender element housed within the housing element and extending outward therefrom, said extender element having an outward extending male end opposed to the female end, said extender element extendible outward from and retractable into the housing element, said housing element additionally comprising one or more nut channels provided therealong for slidingly receiving and retaining therein one or more threadably engageable nuts provided for demountable engagement of another portable module;

wherein the first, second, and third telescoping support component additionally comprise one of a hydraulic actuator system or a pneumatic actuator system or a motorized linear actuator system; and
wherein each of said female ends has a cylindrical receptacle configured for demountably receiving and engaging therein a male end from a non-telescoping module, each of said female ends provided with a locking assembly; and
wherein each of the male ends is configured for demountable engagement with a female end from a non-telescoping module wherein the female end has a cylindrical receptacle configured for demountably receiving and engaging therein one of said male ends.

2. A portable telescoping module according to claim 1, wherein the third elongate telescoping support component comprises a housing element with the male end extending outward therefrom and an extender element housed within the housing element and extendible outward from and retractable into the housing element, said extender element having an outward extending female end opposed to the male end.

3. A portable telescoping module according to claim 1, wherein the one or more receptacles has one or more linear channels for slidingly receiving therein at least one linear set of prongs.

4. A portable telescoping module according to claim 1, wherein the one or more receptacles has one or more prong-retaining slots for slidingly receiving therein at least one linear set of prongs.

5. A portable telescoping module according to claim 1, wherein each of said female ends is provided with a locking assembly for releasable engagement therein with a male end from one or more of the plurality of portable modules.

6. A portable telescoping module according to claim 5, wherein the locking assembly is configured for reversibly engaging a lock sprocket provided at the base of a male end extending outward from one or more of the plurality of portable modules.

7. A portable telescoping module according to claim 5, wherein the locking assembly comprises an extendible and retractable indexing peg.

8. A portable telescoping module according to claim 1, wherein the receptacle is provided with a retaining lock comprising a retaining half-lock with spring receptacles in cooperation with a retaining half-lock having a release button.

9. A portable telescoping module according to claim 1, wherein an exterior side wall of the receptacle is provided with a demountably engageable hatch extending longitudinally therealong, whereby demounting the hatch opens the receptacle for a sideway insertion of one of the male ends into the receptacle and reengaging the hatch securely engages the male end with the receptacle.

10. A portable telescoping module according to claim 1, wherein one of the male ends of the second elongate telescoping support component or the third elongate telescoping support component is rotatable around a longitudinal axis of a receptacle of one or more of the plurality of portable modules.

11. A portable telescoping module according to claim 1, wherein one of the female ends of the first one or more of the plurality of portable modules or the third one or more of the plurality of portable modules is rotatable around a longitudinal axis of a male end of one or more of the plurality of portable modules.

12. A portable telescoping module according to claim 1, wherein the telescoping module has one or more demountable male end(s) extending radially outward therefrom.

13. A portable telescoping module for use in demountably configuring a structural assembly having a plurality of demountably engaged portable modules, the telescoping module comprising:
an elongate telescoping support component comprising a housing element with a first end and an opposed second end wherein the first end has a first male end extending outward therefrom and the second end comprises an end plate with a threaded bore therethrough for threadable engagement therewith a threaded rod provided therefor, said threaded rod extending outward from the second end of the housing, said threaded rod secured to a second male end; and
wherein the male ends are configured for demountable engagement with a female end of a non-telescoping module, wherein the female end has a cylindrical receptacle configured for demountably receiving and engaging therein one of male ends, said female end provided with a locking assembly.

14. A portable telescoping module according to claim 13 wherein the first end has a female end extending outward therefrom and the second end comprises an end plate with a threaded bore therethrough for threadable engagement therewith a threaded rod provided therefor, said threaded rod extending outward from the second end of the housing, said threaded rod secured to a male end.

15. A portable telescoping module according to claim 13, wherein the telescoping module has one or more demountable male end(s) extending radially outward therefrom.

16. A portable telescoping module according to claim 14, wherein the telescoping module has one or more demountable male end(s) extending radially outward therefrom.

* * * * *